US010673822B2

(12) United States Patent
Samid

(10) Patent No.: US 10,673,822 B2
(45) Date of Patent: Jun. 2, 2020

(54) EFFECTIVE CONCEALMENT OF COMMUNICATION PATTERN (BITGREY, BITLOOP)

(71) Applicant: Gideon Samid, Rockville, MD (US)

(72) Inventor: Gideon Samid, Rockville, MD (US)

( * ) Notice: Subject to any disclaimer, the term of this patent is extended or adjusted under 35 U.S.C. 154(b) by 0 days.

(21) Appl. No.: 16/687,690

(22) Filed: Nov. 19, 2019

(65) Prior Publication Data

US 2020/0112548 A1 Apr. 9, 2020

Related U.S. Application Data

(63) Continuation of application No. 16/444,892, filed on Jun. 18, 2019, now Pat. No. 10,523,642.

(60) Provisional application No. 62/857,898, filed on Jun. 6, 2019, provisional application No. 62/850,720, filed on May 21, 2019, provisional application No. 62/813,281, filed on Mar. 4, 2019, provisional application No. 62/805,369, filed on Feb. 14, 2019, provisional application No. 62/782,301, filed on Dec. 19, 2018, provisional application No. 62/714,735, filed on Aug. 5, 2018, provisional application No. 62/689,890, filed on Jun. 26, 2018, provisional application No. 62/688,387, filed on Jun. 22, 2018.

(51) Int. Cl.
*H04L 29/06* (2006.01)
*H04L 9/08* (2006.01)

(52) U.S. Cl.
CPC ........ *H04L 63/0407* (2013.01); *H04L 9/0891* (2013.01); *H04L 63/0471* (2013.01)

(58) Field of Classification Search
CPC .................................................. H04L 63/0407
See application file for complete search history.

(56) References Cited

U.S. PATENT DOCUMENTS

| 7,739,507 | B2 * | 6/2010 | Eckleder | G06F 21/10 |
| | | | | 713/168 |
| 7,844,832 | B2 * | 11/2010 | Nation | G06F 21/645 |
| | | | | 713/168 |
| 8,316,237 | B1 * | 11/2012 | Felsher | H04L 9/0825 |
| | | | | 380/282 |
| 9,948,492 | B2 * | 4/2018 | Jung | H04L 41/5054 |
| 2004/0215963 | A1 * | 10/2004 | Kaplan | G06F 21/34 |
| | | | | 713/172 |
| 2005/0152540 | A1 * | 7/2005 | Barbosa | H04L 9/0858 |
| | | | | 380/28 |
| 2007/0100771 | A1 * | 5/2007 | Eckleder | G06Q 20/3674 |
| | | | | 705/67 |
| 2007/0208952 | A1 * | 9/2007 | Nation | G06F 21/6209 |
| | | | | 713/190 |
| 2009/0235086 | A1 * | 9/2009 | Lai | G06F 21/32 |
| | | | | 713/186 |
| 2009/0293111 | A1 * | 11/2009 | Lai | G06F 21/32 |
| | | | | 726/6 |
| 2011/0026712 | A1 * | 2/2011 | Ducharme | H04L 9/0643 |
| | | | | 380/277 |

(Continued)

*Primary Examiner* — Bradley W Holder

(57) ABSTRACT

This invention establishes a protocol designed to mask the communication pattern that prevails within a group or a community, such that an outside observer has no knowledge as to who talks to whom within the protocol protected group, not how often, nor how much, or whether any communication takes place. Thereby an external observer is denied the intelligence borne in the very pattern of group communication.

13 Claims, 11 Drawing Sheets

Loop Configuration and Functional Conversation

(56) References Cited

U.S. PATENT DOCUMENTS

| | | | |
|---|---|---|---|
| 2014/0123305 A1* | 5/2014 | Jung | H04L 41/5054 |
| | | | 726/27 |
| 2014/0123307 A1* | 5/2014 | Jung | H04L 41/5054 |
| | | | 726/27 |
| 2016/0342777 A1* | 11/2016 | Sadhasivan | G06F 21/14 |
| 2017/0063827 A1* | 3/2017 | Ricardo | H04L 63/08 |

* cited by examiner

Chain of Delivery BitGrey Protocol

Public Ledger BitGrey Protocol

BitMap Composite Ciphertext

BitMap Composite Ciphertext Key Construction

BitMap Composite Ciphertext Decryption Variety

Span Dynamics

Loop Conversation

BitLoop Cipher Decrypts Alice's message only for Bob

BitLoop - Embedded Mode

The Conversations That BitLoop Hides

Functional Components of a BitLoop Member

Loop Configuration and Functional Conversation

EFFECTIVE CONCEALMENT OF COMMUNICATION PATTERN (BITGREY, BITLOOP)

CONTINUATION OF U.S. PATENT APPLICATION SER. NO. 16/444,892

CROSS REFERENCE TO RELATED APPLICATIONS

Provisional Application No. 62/688,387 filed on Jun. 22, 2018; Provisional Application No. 62/689,890 filed on Jun. 26, 2018; Provisional Application No. 62/714,735 filed on Aug. 5, 2018; Provisional Application No. 62/782,301 filed on Dec. 19, 2018; Provisional Applications No. 62/805,369 filed on Feb. 14, 2019; Provisional Application No. 62/813,281 filed on Mar. 4, 2019; Provisional Application No. 62/782,301 filed on Dec. 19, 2018; Provisional Application No. 62/813,281 filed $4^{th}$ of March 2019; Provisional Application No. 62/850,720, filed May 21, 2019; Provisional Application No. 62/857,898 filed 6 Jun. 2019; The preceding applications are referenced in the continued application Ser. No. 16/444,892.

BRIEF SUMMARY OF THE INVENTION

We present here tools, solutions, methods to conceal the pattern of confidential communication. They are based on equivocation. If a message is received by many recipients, it hides the intended one. If a protocol calls for decoy messages, then it protects the identity of the sender of the contents-laden message. BitGrey is a protocol that creates a "grey hole" (of various shades) around the communicating community, so that very little information leaks out. In addition the BitLoop protocol constructs a fixed rate circulating bit flow, traversing through all members of a group. The looping bits appear random, and effectively hide the pattern, even the existence of communication within the group.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

The very pattern of data flow and communication order is a rich source for intelligence and spying, even when the messages themselves are robustly encrypted. Concerted effort is being made to hide this tale-tell pattern. These pattern concealment methods vary in their approaches. This invention identifies a strong effective candidate to compete with its alternatives.

How much we say, to whom, and when, is inherently telling, even if the contents of our communication is unclear. In other words: encryption is not enough; neither to secure privacy, nor to maintain confidentiality. Years ago Adi Shamir already predicted that encryption will be bypassed. And it has. The modern dweller of cyber space is routinely violated via her data behavior. Also, often an adversary has the power to compel release of cryptographic keys over well-exposed communication. The front has shifted, and now technology must build cryptographic shields beyond content, and into pattern, even as to existence of communication. We present here tools, solutions, methods to that end. They are based on equivocation. If a message is received by many recipients, it hides the intended one. If a protocol calls for decoy messages, then it protects the identity of the sender of the contents-laden message. BitGrey is a protocol that creates a "grey hole" (of various shades) around the communicating community, so that very little information leaks out. In addition the BitLoop protocol constructs a fixed rate circulating bit flow, traversing through all members of a group. The looping bits appear random, and effectively hide the pattern, even the existence of communication within the group.

INTRODUCTION

We have fought for freedom in the physical world, and now the war moved to cyber space. Thesis: if everything you do, say, move, think—is known to everyone including those who wish to limit you in some way—then you don't live in the land of the free. We are witnessing the stunning technology of big data that can gobble in the wealth of personal activity and spit out a chillingly accurate prediction of its subject's next move, and when he will do what, when smile, when cry, even when die. If someone knows so much about us, they have a means of controlling us, and freedom it is not. A basic measure of privacy is essential.

Since the big data technology is unstoppable, the battleground moves to the raw material—the data. The only way to protect freedom is by denying others a full view of everything about us. And we call upon technology to help. We need the means by which we can conceal at least some of what we do, act, say, and go. And for that encryption is not enough. We reveal our soul, so to speak, through meta data, through disclosing when we said what to whom.

What is true on a personal basis, is true on a larger scale, business, organization, and national security. While each detail of our action by itself is not revealing a whole lot, the compendium of these unclassified data is what big data uses as raw material to crunch and simulate our future actions.

It is that important to come up with solutions to hide, to conceal, at least some, of what we do and say. This discussion is presenting such means.

We present two complementary concepts: BitGrey and BitLoop. In both it is clear that concealment occurs, and in that it is different from steganography. The claim is that the apparent communication pattern offers fundamental equivocation that denies its cryptanalyst the ability to discern who is sending messages to whom, when, and for how long, as well as who received which message, if at all. The adversary will hammer the data flow and the BitGrey and BitLoop protocols will keep hiding it. A sufficiently powerful adversary may obliterate the privacy protocols, but arguably cannot crack them.

There are numerous instances where people wish to hide their communication pattern in order to successfully achieve a particular goal. However, it is being claimed that practicing these protocols is also important as generic means to frustrate the numerous "data vultures" that as a matter of course collect any and all information about us in order to successfully build a model of our decision making to be exploited for their aims.

This presentation is focused on the protocol, application discussion will follow.

Related Work:

Multi party communication (MPC) is a rich research field with some proximity to the situation at hand, but too far for any practical reference. The challenge addressed in MPC research is how to emulate a trusted broker to mitigate among mutually mistrustful participants. And that for the purpose of establishing inner group communication. To the extent that the participants are not fully mutually revealing, the resultant communication may hide some patterns by the anonymity of the communicators. This effort relates more to the well established field of de-anonymizing communicators, usually by tracking statistical behavior. The idea being that an encrypted message sent by an unknown sender establishes the desired security. This in practice is not very convincing. Party identities can be hidden for only so long. Eventually everyone has an idiosyncratic behavior and is exposed. The fully exposed communication pattern then would work against them.

A closer research effort relates to the old craft of steganography: hiding the very existence of communication. There is a rich body of literature, and many creative means are known to communicate in stealth. The practical problem with these methods is that they generally don't scale well, and often rely on ad-hoc creativity, while being irreconcilable with a rigid protocol.

The solutions presented here don't hide the fact of communication. In fact the very application of BitGrey or BitLoop assert the use of hidden communication. The resultant communication dynamics hides the communication pattern within the communicating community, accompanied by the assertion that it cannot be cracked beyond the appraised combinatorial vulnerability of the underlying ciphers. In practice, the claim is that the protected communication are sufficiently blurred and unextractable by an adversary, given the underlying cryptographic assumptions.

The closest literary reference to BitLoop is the "winnowing and chaff" by Rivest. On which this solution is built. [5,13]

This work relies on material presented in the various publications that describe the underlying ciphers, as well as the fundamental idea of BitLoop. [4, 6, 8, 9,12,14]

Overview: We discuss two variations (chain of delivery, and public ledger) to the same idea where a large number of recipients of a message would conceal the identity of the one or few for whom the message was intended and who could properly decipher it. An eavesdropper would not have means to distinguish between the intended recipient and the decoy recipients. In one way the message traverses through many recipients, in the other, the message is downloaded by many from a public ledger. Sender's identity is concealed by having parties send decoy (random) messages that follow the protocol of content-loaded messages. The protocol allows for a monetary incentive for the concealment, paid either by the sender or from a community fund.

INTRODUCTION

Public privacy has been so seriously violated that residents of cyber space all but reconcile with their data nakedness, and deep exposure. Alas, as much as technology took our privacy away, it should be called upon to restore it back, at least in part. While encryption is touted as the main weapon in the privacy arsenal, it is far from being sufficient. Anyone with a handle on how much we say to whom and what messages we receive from which source, will have a pretty good reading on who we are. It is therefore that we need to focus on hiding our communication pattern, which is the topic herein.

Let's first focus on a method to hide the recipient of a message. This applies mostly for the case where the message one sends is encrypted. A "Dear John" letter is clearly addressed to John. A cryptogram does not inherently reveal whom it is intended to. If a powerful adversary is aware that Alice sent an encrypted message to Bob, then the adversary can apply all sorts of pressures on both Alice and Bob, to reveal the contents of their message. But if the very same message was read by Bob and by a ten more readers, then each reader may claim that the message was not meant for him or her, and Alice can come up with an exculpatory story. Alice defense is even stronger if 1000 readers consumed her message. So what is left to figure out is a mechanism for getting all those "non-decoy" readers to take the message in and effect the confusion.

We present two such mechanisms: (1) chain of delivery and (2) public ledger. In the first Alice messages bounces off the decoy readers and the intended readers, and in the second all the readers download the protected message from a public ledger. Since in either way this action is a burden on the decoy readers, this should be accomplished either (1) through community service where one helps others, expecting others to help him or her, or (2) through a monetary incentive. The latter enjoys the advantage of allowing Alice to increase the degree of equivocation (the number of decoys) by offering a larger sum for these decoy services.

The overall BitGrey equivocation protocol may call on parties to randomly send random message towards a sufficiently large number of recipients. This practice would arm an interrogated sender with a valid explanation to any real message he or she sent, and amount to concealing the identities of parties who send content-loaded messages.

Definitions

The environment of reference is comprised of a community of communicating, or potentially communicating parties. The parties may be referred to as "nodes" or "readers" and the community as a "network". This community might in fact be a sub-community of a larger community, and the parties may be human or devices. There assumes to be a viable privacy threat: an agent who aims to learn about the community through its communications: content and pattern. The privacy threat agent (also referred to as "privacy killer") assumes to have access to the messages that flow back and forth within the community.

It is generally assumed that the messages involved are robustly encrypted, and the privacy killer remains challenged by the encryption, namely the contents of the message remains secret, only the pattern of their dispatch is exposed. It is further assumed that the privacy killer is in a position to extort the nodes and demand full disclosure of the content and the parties of the messages. The envisioned defense for the sender is (1) the message is a random string, meaningless, and (2) the recipients were selected randomly as either participation in the privacy promotion practice or as a revenue generator. The envisioned defense for the recipient of the message is that (1) the recipient can't read it because it was not intended for him, and he has no keys to decipher it, if indeed it is a meaningful message and not a random sequence.

The term communication pattern reflects information regarding the identities of the communicating parties (sender and intended recipient), size, timing, and back and forth sequences of the running messages.

Chain of Delivery BitGrey Privacy Protocol

In this mode we distinguish between "pre-address" and "post address" modes. In the first mode the sender identifies a series of recipients and releases the message within the community. Any party (node) that does not find itself on the recipients list passes the message further. Any party that finds itself identified on the recipients list will mark on the message that it read it, and then pass it on. The party that is the last to mark itself as having read the message will return the message to the sender, to assure the sender that all the designated recipients became aware and read the message. Among the parties who read the message there exists the one or more who were the target recipients. But this distinction does not leak outside. Some designated readers will not be able to extract content from the message because they don't have the right keys.

In the post address mode the sender releases the message to the community, and each party marks as 'read' once receiving the message. The message keeps being pushed from one party to another until the entire community has read it, and then the message returns to the sender. This is feasible in smaller communities.

Note that this protocol does not specify any particular route for the message within the community.

Public Ledger BitGrey Mode

In this mode Alice posts its message on a public ledger from which a sufficient number of readers download it.

Recipient Targeting

For the BitGrey protocol to work it is necessary for reading nodes to be able to discern between messages intended for them as recipients and messages not intended for them, or decoy messages that are not intended for any reader, and are there to confuse the privacy threat agent. This distinction cannot be as a plain tag on the message itself, since the privacy killer will be able to read it too. Even an encrypted tag is not a very robust means of distinction. Any such static designation will be quite readily identified by the adversary.

We conclude then that the distinction of being an intended reader of a message must be based on something privately known by each reader (not by anything in the message itself). A simple way would be to have any reader decrypt an incoming message with its privately held key, and if it makes sense then it is intended for that reader. If it reads as gibberish then not. This is not a very clean method because some content may be borderline; it may look random, but it really is a message of good contents, only with appearance of randomness. There would be too many errors and the distinction may be too complex. What is needed is a clear-cut distinction between message intended for a particular reader, and all other bit strings. This requires a suitable cipher.

Recipient distinction may occur via one of two modes:
1. decoy tolerant ciphers
2. composite ciphertext The decoy method is simpler and will be discussed below. The composite ciphertext is a more involved solution, but with rich opportunities for managing the community. It will be discussed ahead.

We define a "Decoy Tolerant Cipher" as a cipher which quickly, easily and unequivocally distinguishes between proper message bits and decoy bits. The former it decrypts the latter it discards.

Decoy Tolerant Cipher

Normally ciphers are designed to decrypt everything fed into them by way of ciphertext, assuming all the feed is bona fide decryptable material. A Decoy Tolerant Cipher, by comparison, is a cipher that is designed to quickly winnow the wheat from the chaff—to use the expression first introduced by Ron Rivest [13]—and only decrypt the wheat. The faster and more efficient the classification (wheat, chaff) the more tolerant the cipher to very diluted message streams, where the wheat drowns in the chaff. And the more so, the greater (1) the cryptanalytic challenge for the cryptanalyst, and (2) the greater the power of the applicable protocol to carry out special tasks, like the one envisioned in the BitGrey protocol.

BitFlip as a Decoy Tolerant Cipher

BitFlip is a poly alphabet cipher. [12, 9]. Each letter of each alphabet is comprised of a distinct (secret) bit string that counts m bits. Each letter of each alphabet is associated with a target Hamming distance h. All the strings that have a Hamming distance h from a given letter are evaluated to this letter. A string of s bits that does not evaluate to any letter in a recipient's alphabet is regarded as nonsense and discarded. Same for strings that evaluate to more than a single letter. BitFlip, hence is inherently a decoy tolerant cipher.

Composite Cipher

We consider a situation where n plaintext messages, $P_1, P_2, \ldots P_n$ are encrypted via some ciphers with the respective keys $K_1, K_2, \ldots K_n$, to generate n respective ciphertexts $C_1, C_2, \ldots C_n$. We now consider a "consolidated cipher", CC, which takes in as input the n plaintexts, and the n keys, and generates as output a "composite ciphertext", $C^n$.

$$C^n = CC(P_1, P_2, \ldots P_n, K_1, K_2, \ldots K_n)$$

We further consider n corresponding decryption procedures $DEC_1, DEC_2, \ldots DEC_n$, such that DEC (i=1, 2, ... n) takes in the composite ciphertext and generates $P_i$ as output.

$$P_i = DEC_i(C^n)$$

This is a composite cipher environment.

A composite cipher environment offers a unique security advantage: equivocation. An attacker in possession of the composite ciphertext may at most 'crack' the ciphertext to the point where all k keys are identified, and all the plaintexts are known. Yet, the attacker will not be able to learn from the composite ciphertext which of the n plaintexts, were actually read by a particular recipient of the composite ciphertext. This distinction depends on which of the k keys a particular recipient was using. That key is not communicated, and is not identified in the ciphertext among the other (n−1) keys.

To sharpen the inherent security within a composite ciphertext, we may think of Alice giving Bob instructions to move in one of the four directions North, South, East, or West. Alice will identify four plaintexts $P_1, P_2, P_3, P_4$ each directing Bob to take one of these four directions. Using a composite cipher Alice will generate ciphertext $C^4$. Alice previously exchanged key $K_3$ with Bob, and so she knows that Bob will evaluate $C^4$ to $P_3$ and therefore move East. However, an attacker capturing $C^4$ will not know which of the four keys is used by Bob. So for the attacker—however smart—the situation is fully equivocated. Bob will be regarded as having equal chances to go in any of the four directions. This equivocation is inherent in the composite ciphertext, regardless of the particulars of the cipher.

A $C^n$ composite ciphertext may in fact be evaluated to $2^n-1$ plaintext messages. This is because any combination of $0 < m \leq n$ plaintexts selected from the n plaintext $P_1, P_2, \ldots P_n$ may be regarded as a distinct plaintext evaluated from the same composite ciphertext.

Let plaintext $P_1$ be an instruction from Alice to Bob to move from where he is located according to a specified vector V, (length of movement and direction of movement). For every combination of the $2^n-1$ sets of plaintexts, Bob will be moving to a particular spot in the space where his motion is taking place. This challenges an attacker with equivocation marked by $2^n-1$ distinct spots.

Key combinations allows one to build a confidentiality cascade. An arrangement where one class of recipients [1], is given key $K_1$ while a second, "higher", class of recipients, [2], is given keys $K_1$, and $K_2$. Readers from class [2] can read everything class [1] reads plus more content that class [1] cannot read. Similarly class [i] will be given keys $K_1, K_2$, so they can read everything that classes [1], [2], . . . [i−1] reads, plus content that these lower classes don't read.

We present some ciphers that may be used to construct a composite ciphertext environment.

Illustration:

Let $C^4$ be a composite ciphertext over the four plaintext messages, relating to movements over a Cartesian map: 1. move 1 meter to the right, 2. move 1 meter upwards, 3. move one meter to the left, and 4. move one meter downwards. Alice sends this composite ciphertext to Bob. A smart attacker intercepts this composite ciphertext and prepares a map that lists all the possible locations that Bob may be instructed to be, following the instructions in the composite ciphertext. The list shows 9 distinct outcomes. The attacker cannot further limit this list by extracting more information from the captured composite ciphertext.

| Key Combinations | Bob's Coordinates: |
|---|---|
| 1 | (1, 0) |
| 2 | (0, 1) |
| 3 | (−1, 0) |
| 4 | (0, −1) |
| 1, 2 | (1, 1) |
| 1, 3 | (0, 0) |
| 1, 4 | (1, −1) |
| 2, 3 | (−1, 1) |
| 2, 4 | (0, 0) |
| 3, 4 | (−1, −1) |
| 1, 2, 3 | (0, 1) |
| 1, 2, 4 | (1, 0) |
| 1, 3, 4 | (0, −1) |
| 2, 3, 4 | (−1, 0) |
| 1, 2, 3, 4 | (0, 0) |

Had the four instructions be +1, to the right, +2 upwards, +3 to the left, and +4 down, the table would look like:

| Key Combinations | Bob's Coordinates: |
|---|---|
| 1 | (1, 0) |
| 2 | (0, 2) |
| 3 | (−3, 0) |
| 4 | (0, −4) |
| 1, 2 | (1, 2) |
| 1, 3 | (−2, 0) |
| 1, 4 | (1, −4) |
| 2, 3 | (−3, 2) |
| 2, 4 | (0, −2) |
| 3, 4 | (−3, −4) |
| 1, 2, 3 | (−2, 2) |
| 1, 2, 4 | (1, −2) |
| 1, 3, 4 | (−2, −4) |
| 2, 3, 4 | (−1, 0) |
| 1, 2, 3, 4 | (−2, 2) | where the equivocation is over 15 distinct options.

BitMap Composite Ciphertext Cipher

BitMap [Appears as "Denial Cryptography", as "Cryptography of Things", as "At Will Intractability Cryptography" and as "Drone Targeted Cryptography", see 14, 8, 4] inherently generates a ciphertext larger than its plaintext. It is easy to increase the size of the ciphertext with many letters sequence that collapses into a single letter. This is done by marking a path on the BitMap graph where the path traverses vertices which are of the same letter. This means that for a given decryption key the input (ciphertext) flow may have as many superfluous letters (bits) as desired.

Here is one way to use BitMap to build a composite ciphertext. The procedure starts with generating a BitMap pathway (ciphertext $C_1$) to represent the first plaintext, $P_1$. Then generating a BitMap pathway (ciphertext $C_2$) to represent the second plaintext $P_2$. Let a vertex marked X be any vertex in the $C_1$ path. One would then expand that vertex (replace it) with the map used to draw pathway $C_2$ on, and draw $C_2$ on that map, such that $C_2$ is grafted into $C_1$. When preparing the key for the $P_1$ reader, all the vertices which are part of the $C_2$ map will be marked as X. This will insure that the combined pathway $C_1+C_2$ will be interpreted as $P_1$. For the reader of $P_2$, one will mark as letter X all the vertices in the first map, used to draw $C_1$, and leave the vertices in the second map, where $C_2$ is drawn untouched. This combined map (key) will insure that the intended $P_2$ reader will interpret the combined $C_1+C_2$ composite ciphertext as $P_2$.

This grafting can continue at any spot of the combined $C_1+C_2$ pathway, and generate $C_1+C_2+C_3$ composite pathway, and so on for all n plaintexts. The composite ciphertext $C_1+C_2+C_n$ will be evaluated to $P_i$ (for i=1,2 . . . n) through $K_1$ constructed as described herein.

A second method is described here: In order to use BitMap for this purpose it would be necessary to prepare a key that would be able to handle any message sent for any key. One way to do so is to construct a BitMap key comprised of (n+1) regions, fitted to handle n participants with n keys. The BitMap key will be comprised of a central n-sided polygon, where each edge of the polygon will be a basis for a key that can be used to describe any message of any size. These n keys will be spread each off their respective edge of the polygon. They will be regarded as specific keys. All the vertices in the internal n-sided polygon will be marked with one letter, say X. Also all the vertices that make up the n edges of the polygons will be marked as letter X.

Each party will receive the same key (comprised of the internal polygon and the n specific keys). Party i will receive a key such that its specific area will be marked with the letters of the alphabet according to the terms of the BitMap cipher, namely such that any message of any length can be fully encrypted in each of the n specific keys. All the vertices others than those comprising the specific area for the party, will be marked as the letter X.

In summary, the n parties will be using the same geometric structure as key, only that for each party only its own specific section will be marked with the full letters of the alphabet, while all the other specific sections, as well as the internal polygon will be marked as letter X It will be required to dictate that every message for every party will start with one vertex marked X and part of the edge of the polygon. Also all messages will have to end up at a vertex that is part of the same edge. This can always be achieved, by padding any message with an agreed upon number of letters that should be discarded upon decryption, and are there only in order to allow the pathway (the ciphertext) to extend so that it ends at the edge of the polygon.

To construct the composite ciphertext one will mark the n pathways (ciphertexts, $C_1, C_2, \ldots C_n$) each on its own section of the overall key. Next the n pathways will be threaded to a single pathway. This will be done by connecting the end point of pathway $C_i$ with the starting point of pathway $C_{i+1}$. (for i=1, 2, ... (n−1)). The connection will be done in any way that traverses through only universally X marked vertices on the polygon or its edges. A universally marked X vertex is a vertex that is marked as X for all the n parties.

Such threading of the n pathways ($C_1, C_2, \ldots C_n$) to a single composite ciphertext $C''$ will conclude the encryption. $C''$ will then be used in the BitGrey protocol. The composite ciphertext may be passed to all the parties. Each party i will be blind to all the individual pathways ($C_1, C_2, \ldots C_{i-1}, C_{i+1}, \ldots C_n$) that comprise $C''$, and see only its own pathway, $C_i$ which it will correctly decrypt to $P_i$.

BitMix Composite Ciphertext Cipher

BitMix is a complete transposition cipher. It features a key space of size $|K|=p!$ applicable to transpose a series of p data elements to any of the possible p! permutations. Let us now construct a composite plainext as follows:

$$P^{ni}=P_1-P_2-\ldots P_i-P_{i+1}-\ldots P_n$$

comprised of the n plaintexts $P_1, P_2, \ldots P_n$ and a 'separator element', "*", which is placed between $P_i$ and $P_{i+1}$. The interpretation of $P^{ni}$ will be as follows: the instructions expressed in the plaintext messages that are placed left of the "*" separator should be regarded and followed and all the plaintext messages that are placed right of the "*" separator should be ignored.

There are $2^n-1$ distinct such $P^{ni}$ composite plaintexts. Let $P^{nm}$ be one particular composite plaintext. Let us now encrypt $P^{ni}$ using BitMix. This will be effected through a transposition key $K_m$, and will result in a composite ciphertext $C^{nm}$.

Because BitMix is a complete transposition ciphertext there is a definite and unique key that transposes every one of the $2^n-1$ possible composite plaintexts to the same composite ciphertext $C^{nm}$. An attacker will not be able to extract from the composite ciphertext the key that was actually used to create $C^{nm}$, and will face an equivocation over the $2^n-1$ possible composite plaintexts.

BitFlip Composite Cipher

BitFlip is a super polyalphabetic cipher. Each of the n recipients is using a set of distinct alphabet. Each letter of the ciphertext will be evaluated as a proper letter only by one of the n recipients; the other would discard this letter. So a sender can put together a composite plaintext comprised of n distinct message, $M_1, M_2, \ldots M_n$, encrypt the letters of each message with the key used by the intended recipient such that each recipient will discard all the letters except the ones intended for her, which she will evaluate correctly.

The BitGrey Protocol

A community of communication parties (a network) may activate the BitGrey protocol to conceal the information regarding their communication pattern. It is activated when the community wishes to hide such information from outsiders, and also from "insiders". The latter refers to the situation where parties in the communities are aware of messages they send or receive, but know not who sends other messages to whom. This situation is accomplished by lack of knowledge of cryptographic keys. A community may share cryptographic keys and thereby hide the communication pattern only from outsiders, or a community may have degrees of mutual secrecy of such keys.

The BitGrey protocol has two parts: (i) recipient concealment, and (ii) sender concealment.

Recipient Concealment

Recipient concealment happens either through decoy-tolerant ciphers or through composite ciphers. In both ways a message can be sent to as many parties as desired, and only the intended party, or parties will interpret the communicated ciphertext into the plain message sent out by the sender. The others will either treat such message as random bits, or realize it is a message not intended for them.

Since the ciphertext is evaluated by each party in private, an outsider who traces all the communication among the parties will not be the wiser as to who is the party that evaluated the ciphertext to its intended message.

Upon interrogation each party that received the message can claim that it checked it out and it did not amount to any message they could read.

The larger the number of recipients of the ciphertext, the greater the equivocation, the greater the cryptanalytic confusion, and the greater the entropy.

Sender Concealment

In order to conceal the event of sending a meaningful message within the community, the protocol calls for the parties to randomly compose decoy messages (random bits) and execute the recipient concealment protocol, sending that decoy message to others as if it were a meaningful message. All the recipients of this decoy message will discard it.

This randomized decoy operation will allow each sender to respond to interrogation with the claim that what they sent was part of this sender concealment as called for by the protocol. Thereby insist that there is no plaintext to be revealed, since the ciphertext is meaningless.

Shades of Grey

The interplay between sender-concealment and recipient-concealment will determine the 'shade of grey' in the protocol. We first discuss the boundary conditions: 'almost white grey' and 'black grey'.

'Almost white grey' state is when sender-concealment is practiced at a minimum, or even not at all. As long as the protocol calls upon parties to randomly send decoy messages to parties in the community then any sender, under interrogation can say—that what I did. If that is the state of sender concealment then an outside observer will have good reading on the level of communication that transpires within the community. The recipient concealment will prevent the observer from finding out who received which message, but the overall intensity and characteristics of the community communication will be rather exposed.

The 'black grey' state is when sender concealment overwhelms real messaging. So much so that the latter becomes an undetected 'noise' within the dynamics of the former. To practice a 'black grey' protocol a community at time point $t_s$ will start a barrage of sender concealment decoy messages, and continue with it until some end point $t_e$. At Some time point $t_b > t_s$ the community will begin to send real messages among its parties, as needed by their circumstances. At time point $t_f < t_e$ the community will finish sending the real messages. During the interval of $t_s$ to $t_f$ the flow rate of meaningful messages will have to be much smaller than the decoy messages so that the real messages will be concealed through having no statistical distinction over the normal noise of the decoy messages. So practiced, the 'black grey' state will reveal to an outside observer that some time between $t_s$ and $t_e$ there was probably some meaningful communication within the community, but the window $t_b$ to $t_f$ will not be exposed, and neither will the pattern of such communication.

Black-grey state may be expensive to uphold, it requires a lot of stray flow of random bits, so in practice communities will decide per the significance of the matter they wish to conceal, what is the optimal shade of grey for their situation, namely to decide how many decoy messages to use.

Applications (BitGrey)

Applications of the BitGrey protocol may be classified by whether they are used for internal segregation or for defense from external eavesdroppers. Also, whether the community involved is large or small.

The protocol may be operated with a monetary incentive.

Key Management

The BitGrey protocol calls for n parties to have n cryptographic keys. Some or all of these keys may be the same. If all the keys are the same (just to prevent outsiders from reading the community messages) then the addressee must be identified in the plaintext. If no two keys are the same, there is no need to identify the recipient (addressee) in the plaintext. Some parties may possess the keys of all the rest, some may posses the keys of only a few of the parties. Even if a party has only the key of one other party, it can still participate in the BitGrey protocol, because the adversary does not know how many keys each party has.

The community may be managed through a key management table that identifies which keys are known to which party. For example a community comprises of parties A, B, C, and D having keys $K_a$, $K_b$, $K_c$, and $K_d$ respectively may be managed through a matrix like below

| Key | Party | | | |
|---|---|---|---|---|
| | A | B | C | D |
| $K_a$ | X | | | X |
| $K_b$ | | X | | X |
| $K_c$ | X | | X | |
| $K_d$ | X | X | X | X |

Party A can send message to everyone. Parties B and C can only send messages to party D, and party D can send messages to everyone except to party C.

Monetary Incentivized BitGrey

We consider two options: (i) community funds, and (ii) peer to peer payment. In the first mode one establishes a community fund from which to incentivized parties to participate in the BitGrey protocol. In the second mode the parties themselves pay to other parties. A combination of these two modes is also possible.

Community Funds:

The community funds will pay parties to send decoy messages that look like content-loaded messages, and do so in order to achieve the desired "shade of grey" as discussed above. The community funds will incentivize parties to pass read messages forward to marked readers who have not yet read the message.

Peer to Peer Payment:

A sender may wish to protect its message with a very active BitGrey protocol and to that end will pay other parties the way a community fund would have paid them.

BitGrey Money:

The money incentivizing BitGrey practitioners will be digital money. BitMint platform is ideal because it pays at any desired resolution in a frictionless manner, and requires participation of only the payer and the payee, no need for a third party authenticator.

Enterprising BitGrey

The BitGrey protocol may be enterprised and monetized as a service for a community. The BitGrey service provider will design the details, select ciphers, assign keys, and incentivize parties to support the protocol through monetary compensation.

BitLoop: Zero Information Leakage of Network Communication Activity

Multi-Party Communication where the Content, the Pattern, and Even the Existence of any Inter-Party Communication is Concealed Despite Complete Capture of all the Communicated Bits.

A group comprised of g of well ordered members i=1, 2, . . . g will experience a circular fixed bit rate, C (bits/sec) communication flow such that each party, i, contributes $c_i$=C/g bits/sec, and removes its bits when they are returned to it following a full circle. The $c_i$ bits/sec comprise for j=1, 2, . . . (i−1), (i+1), . . . g bits/sec which carry content (message bits) for up to each of the other (g−1) parties, and $d_i$ bits/sec which are decoy (random) bits. $c_i$=Σ $m_{ij}$+$d_i$. Each party j identifies all the messages intended to it: $m_{1j}$, $m_{2j}$, . . . $m_{nj}$, and ignores all the other bits. An eavesdropper will see a fixed circular bit flow which may be totally decoy—meaningless, or may harbor any pattern of communication between any two or more of the n members group. As long as all the circulating bits appear random enough, the group does not leak any information regarding their internal communication.

Introduction to BitLoop

We address a situation where a group of g members, agents, wish to hide their internal communication in a situation where the communicated traffic is exposed. If all the communicated bits are content-loaded, then their flow is quite revealing, even if the bit flow retains their content concealed owing to uncompromised encryption. The content-laden bits identify who is talking to whom, how often, and in what configuration relative to other messages back and forth.

To prevent this leakage of information the group of g members may mix their content-laden bits with random, or so called, decoy bits. The mixing will have to be such that the eavesdropper will not be able to distinguish between decoy bits and content bits, but the group members (agents) will readily carry out this distinction.

To achieve this goal, we propose the BitLoop protocol. It will render the group into a "black hole" in as much as they won't leak information about their communication pattern throughout the application of this protocol.

The BitLoop protocol requires encryption, which in turn can be used to send messages to one or few designated recipients, and not to the others—depending on key distribution. In the basic mode the agents share a single encryption key, and hiding is projected only toward outsiders.

Loop Flow

We consider g members of a group fitted in order: 1, 2, . . . g. Member i is considered as communicating C bits/sec to member (i+1), for i=1, 2, . . . (g−1). Member g is passing C bits/sec to member 1. So described there forms a flowing loop, in a steady state, given that the identities of the bits is ignored.

We first assume the baseline state where all the bits in the loop are randomly selected, and the bits that flow from one member to the next are the same. In that case the only information that leaks outside the group is the order of the group and the rate of bit circulation. However such a state does not allow the members of the groups (the nodes) to exchange any messages. We therefore advance the state by allowing several bits to flip between nodes. An outside observer will be able to monitor how many and which bits have flipped. This observation will amount to information leakage if the bit flipping correlates to content, to communicated messages. However, if the bits flipped by each node are also randomized, then they leak no information, except the count of how many bits flipped. Alas, this will be the only information gathered by the nodes themselves.

The interesting state happens when the nodes use a protocol where the flipped bits are indistinguishable from a random flow, but in fact they convey information. We present a content-hiding bit-flipping protocol: BitFlip [5, 9,12]. The BitFlip protocol is activated within the BitLoop protocol that insures a loop flow of a fixed bit rate, where a random number of bits are flipped as they pass from one node to another. Overall the group runs a communication regimen where each member of the group communicates with any other, and none of the prevailing patterns leaks.

The BitLoop Protocol

We first describe this protocol in its steady state then how to get it started and how to stop it.

In a steady state a flow rate of C bits/seconds circulates through the members of the group. The members are set in a fixed order 1, 2, . . . g. Each member passes the full bit flow of C bits/sec to the next member in order. Member g circulates back the C bits/sec to member 1. So the bit stream flows from member i to member (i+1) for i=1, 2, . . . (n−1). Each node contributes C/g bits/seconds to the flow. Each node in turn removes the bits it contributed to the flow in the previous round, and replaces them with new bits. That way the flow rate is kept stable (C bits/sec), but the contents is refreshed every cycle.

In its steady state each of the participating circulating nodes takes in the incoming bits as a sequence of blocks, each block comprises s spans, and each span comprises n bits. The span is the basic data unit processed by BitLoop. The number of bits in a block is |b|=ns. Each node analyzes the s spans in a block one by one. For each span the node first decides if this is a span of bits it put in, in the previous round. If it is—then the span is removed, and another span replaces it (how to choose the replacement span will be discussed ahead). If the span is not one that was put there by the examining node, then it will be evaluated by the BitLoop cipher. The BitLoop cipher is either a composite cipher, or a decoy-tolerant cipher. Either way the result of the evaluation is either null (no message taken in), or positive—namely the evaluated span is converted to a content-laden message (plaintext) or part thereto. Message parts in such plaintext form are then concatenated to form the full message sent to the examining node. That is how messages from other members in the group are passed to the examining node.

So operated the Loop Flow is a fixed bit rate moving in order from group member to group member (node to node). Each span flows through each member in n/C seconds. Assuming no delay in the communication lines, the time it takes a span to fulfill a full round is gn/C seconds. Every circulating span (and every circulating bit) has a life span of one round. The circulating bits are removed by the member that put them up when they are returned to the member that put them. Every span of bits put up by any member is passing through all other members. Such spans may be completely random (comprised of random bits) and so no member will extract any meaning (plaintext) from it. A span can be a ciphertext, which does hold the content of its respective plaintext. In that case all the members who are equipped with a fitting decryption key will extract from it the encrypted meaning. Others would not.

The idea of this loop protocol is that from the outside the flow is at constant rate with a random number of bits that get flipped as one member passes the flow to the next. The users of this loop protocol intend to deny any visibility to an outside observer as to which member talks to whom, how much, how often, in what configuration. The appearance of the flow is the same whether all the circulating bits are perfectly randomized or fully content-loaded and for anything in between. This veil is the object of the protocol.

We first describe the "Null State", defined as the state of no communication. None of the g group members communicates with the other. In that state group member i (i=1, 2, . . . g) receives spans at a rate of C/n spans/seconds. (g−1)/g of these spans were put in the stream by some other group members, ("foreign members"), and 1/g of these spans were put into the stream by group member i ("home members"). When member i encounters a foreign span, it regards it as a cryptogram and processes it with her cryptographic key, $K_i$. Because she uses a BitLoop cipher the output of this process is null—no plaintext comes out because the bits were randomized. The member then discards the output, but pushes the original (cryptogram) span further, to member (i+1). When member i encounters a span that it recognizes as one it added to the stream in the previous round, then it replaces it with a new randomized span. Note: an issue arises regarding the probability that another member will by chance put up a span that the member falsely recognizes as its own. This probability can be well managed, and at any rate this coincidence will be spotted real time, and handled via a resolution protocol.

So prescribed, it is clear that the lifetime of a revolving span is one round. As soon as it is being returned to the member that put it up, it is removed and replaced. Every member does so, the flow rate of C bits/sec remains fixed, and the Loop is in steady state.

The null state as described involves no information exchange between the members.

We now describe the method of conversation within the loop protocol. Alice and Bob, two members of the group, Alice is in position i and Bob in position j, (in the group order) wish to run a conversation. Both have unique cryptographic keys, $K_a$, $K_b$ respectively. They both know each other keys (the keys may, or may not be the same). Alice first message is $m_{a1}$. She encrypts it with Bob's key to generate its encrypted version $e_{a1}$=Enc($m_{a1}$, $K_b$). Alice will then divide the cryptogram ($e_{a1}$) to bit strings comprised of n bits each (padding the last span as necessary): $e_{a11}, e_{a12}, \ldots a_{a1n}$. The cryptogram is then written as a sequence of $u=t_{a1}$ spans.

Alice (in position i in the order of group members) now wishes to load the cryptogram $e_{a1}$ to the loop, so that it will reach Bob at position j. To do so Alice waits until she encounters a span she herself loaded up to the flow. Since it is her span, she removes it, but now instead of loading up a randomized span, Alice loads up the first span of her cryptogram for Bob: $e_{a11}$. This content-laden span, will run with the flow from Alice at position i to member (i+1), then to (i+2). And since the flow is circular, $e_{a11}$ will eventually reach Bob at position j. Since for Bob this span is foreign, he will apply it to a decryption process with his key, $K_b$. The result will be the respective plaintext $m_{a11}$.

When Alice encounters the next span she recognizes as her own, she replaces it with the next span from the cryptogram $e_{a12}$, and this span, similarly, reaches Bob who will decrypt it with his key, $K_b$, to extract the respective plaintext $m_{a1n}$.

This will continue span after span: $e_{a11}$, $e_{a12}$ ... $e_{a1n}$. When all the u spans of the cryptograms have been processed, Bob extracts the full message $m_{a1}$.

All other members of the groups not applying Bob's key to the flowing cryptograph spans from Alice, will interpret these spans as 'null', and simply push them further to their next member.

The loop has a finite capacity, which may be less than u—the span count of Alice cryptogram—and in that case Alice will remove from the flow earlier message spans (which Bob has already read), and secure room for subsequent spans of the message.

Bob, wishing to respond to Alice, will activate the same protocol on his part, using Alice's key, $K_a$, to encrypt his message, and thereby Alice reads Bob's message. To which she can reply.

While conversing with Bob Alice can send messages to Carla and David, and others, using their specific cryptographic keys.

All members of the group will run the same procedure when they wish to communicate with anyone within the group. This is the 'live state' of the loop. It's nominal objective is to hide the communication pattern from outside observers. The idea being that external monitors of the loop (unaware of the cryptographic keys used) will see a random-looking flow that looks the same over time, whether it is in the null state, or in the live state, and regardless of how 'live' the state.

Having described the basic run of the loop, we now discuss the issues of (i) starting up and closing down the loop, (ii) capacity, (iii) probability of confusion. The prime issue of quality and features of the BitLoop ciphers will be addressed in a dedicated section.

Starting Up and Closing Down the Loop

The loop circulation protocol may start with setting up a clear order of the g group members: 1, 2, . . . g. The number of spans per second in the loop is C/n (C is the bit rate of the loop, and n is the number of bits in a span). Member 1 will activate a random number generator and construct consecutive bits strings, counting C/g bits, spread as C/gn spans, (C is the number of bits/second for the loop flow rate). Member 1 will push the generated random bits to member 2, all in a time frame of one second.

Member 2 in the order will prepare the same number of spans, C/gn, also by invoking a source of randomness. When member #2 receives the C/gn spans from member 1, it pushes them on to member 3, adding its own C/gn spans. Member 3 now receives 2C/gn spans. It too generates C/gn spans and adds them to the 2C/gn that came to it from member 2. What goes forth to member 4 is a stream of 3C/gn spans. The described process repeats such that every member in turn passes through the bit flow coming its way, and adds to it, its contribution of C/gn spans (all random bits). The flow thus swells from member to member until it reaches a throughput of C/n spans, pushes from member-g, the last, back to member −1, the first. When member 1 receives the full flow rate of C/n spans (or C bits/sec), then the steady state has been achieved. Next member 1, recognizes the C/gn spans it uploaded in the previous round, removes them and replaces them with new C/gn randomized spans. All subsequent members do the same—recognizing their own contribution from before and replacing such spans with new ones.

This is the steady state, null state (no communication takes place within the group). It will last until some member decides to say something to another member, and then the loop protocol as described above is activated.

When the BitLoop session comes to its end (the last message was exchanged in this mode), the flow will continue for a while the way it worked before the first message transpired—a flow of C bits/seconds of randomized bits that contain no content. To end this "after-duty" phase, the start-up protocol will be activated in reverse. The first member would remove the spans it contributed in the previous round, but will not replace them with new spans. As a result the flow from this member 1 to member 2 will be decreased from C/n spans/sec to (g−1)C/gn spans/second. This reduced flow then arrives at member 2. Member 2 does the same, namely it removes the C/gn spans it contributed to the flow in the previous round and offers no substitution for them. The bit flow that goes then from member 2 to member 3 is at a rate of (g−2)C/gn spans/second, Each member in turn will remove the spans it contributed in the last round and push further the remaining span. By the time member g exercises this span removal routine—there are no more circulating bits left, and the BitLoop platform (the null state) is closing down.

Capacity

The set capacity of the loop C bits/seconds limits the communication throughout of the protocol. One would first determine what is the expected communication load to be served by the loop, and use this figure to design the capacity. In its limit all the revolving spans will be content-laden, no room for sheer randomness. However, if practiced as routine, then this fact will likely leak and the advantage of the loop will be lost.

The span throughput of the loop is C/n spans/seconds, which comes to allocating to each of the g members of the group a communication capacity of C/ng spans/seconds. If this throughput is not enough for a particular member, then it will develop backlog, which can always be alleviated by streaming it outside the loop. We may be looking here at a need to allocate the more sensitive communication for loop-compliance, while routing the rest to more traditional ways of communications.

A problem arises if there is a great variance in communication needs between the members. Some may have a lot to communicate and the loop will not suffice, adn other have little to say, and most of the life of the loop they are 'spinning water' namely uploading sheer randomness, with very little actual communication.

Usually a member that is a target for a lot of communication is also a heavy duty communicator itself, but in times, it may be that a member received a heavy load of loop-communicated messages while it itself is saying very little in return.

Such variety should be well considered for the determination of the desired throughput.

Other considerations include the load to keep the null state and the overall random bit communication.

In some ways the important count is spans rather than bits, and so the value of n (bits per span) is critical too. Especially so in the case where the BitFlip cipher is being used. Generally the decoy-tolerant and the composite ciphers require a large span to operate correctly. Large spans reduce the span throughput per a given bit rate. Also large spans reduce the likelihood that the same span will be issued by two different members. This will slow down the operation, but not stop it. So because either one of the two involved members will identify the problem, and notify the source of this message, requesting a re-send.

BitLoop Ciphers

BitLoop ciphers must satisfy the same requirements stated for BitGrey protocol, namely decoy-tolerant ciphers or composite ciphers. The choice of cipher determines the size of the span. Composite ciphertexts may require large spans.

Implementation

BitLoop needs a project manager to implement it. This manager may be external, or may be member number 1. Activities include system design, and operation control.

Design includes setting up the bit rate, the span size and the required ciphers. It also includes rules of behavior in case of difficulties like a broken chain, or incantation of a member. In such cases the project manager will need to make sure that a notification of the arising difficulty is disseminated through the group along with a mention of which rule of behavior applies.

In the event that the set bit rate is insufficient, it is always possible to close down the BitLoop session, and restart another with a higher bit rate.

Applications

BitLoop may be used for intense high level communication concealment, or for low-intensity long term application. It may be used on a stand alone basis or in an embedded form.

When applied in an embedded form the communicating spans will have to be identified as such, since they are embedded in additional communication. In that case the spans may be encapsulated in a bit-frame consisting of a header and a trailer. Will be used mostly for low intensity applications.

The BitLoop protocol may be used with complete internal visibility, or with zero internal visibility, or anywhere in between.

Visibility Status Applications

The BitLoop protocol may be used with complete internal visibility, or with zero internal visibility, or anywhere in between.

The case of full internal visibility can be constructed through either a shared key, or a shared key matrix. In a shared key the addressee needs to be identified in the message itself. In a shared key matrix, the identity of the key that properly evaluates the incoming span is the indication of addressee.

Figure 1:
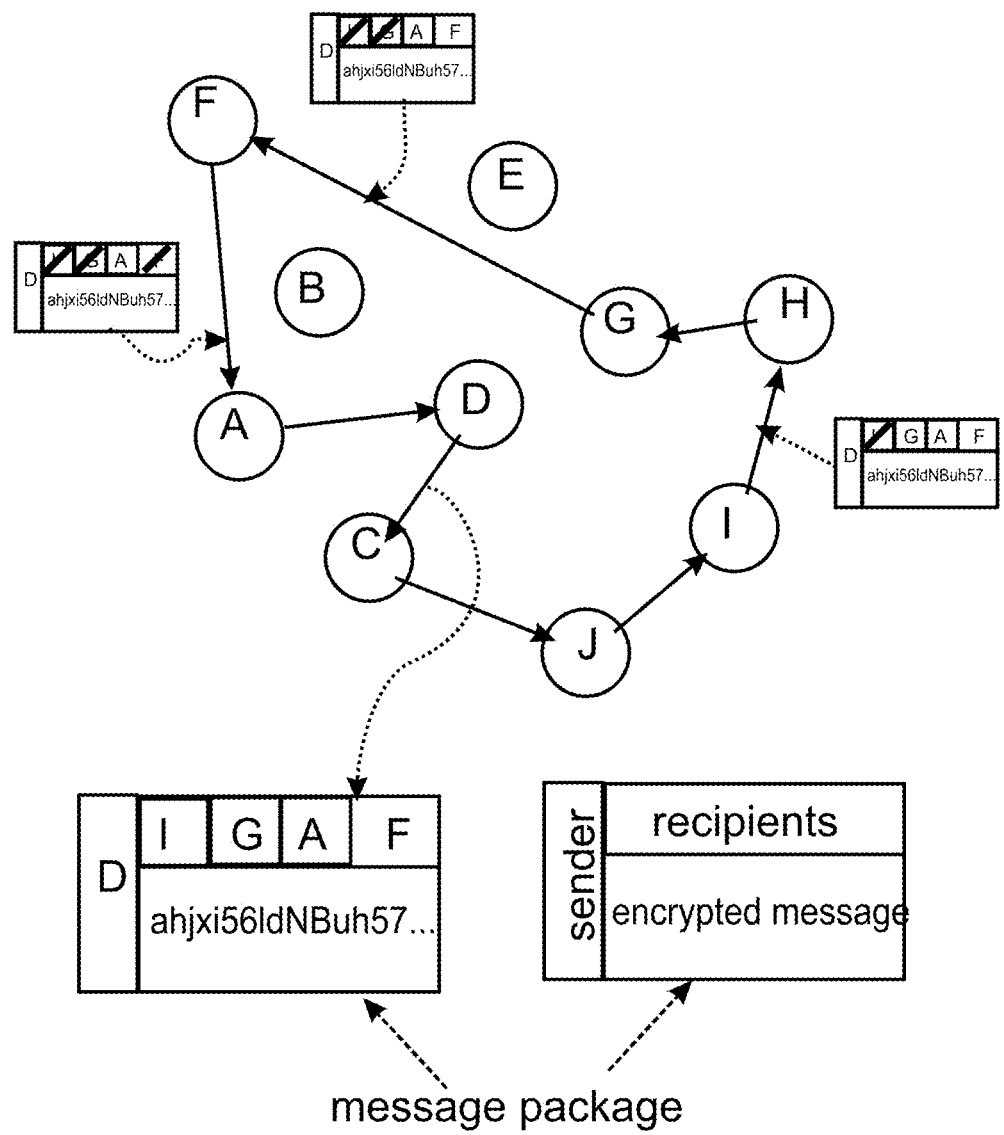
FIG. 1: Chain of Delivery BitGrey Protocol

A community of communication parties designated as A, B, C, D, E, F, G, H is shown. Party D wishes to send a confidential message $P_g$ to party G. To do so party D encrypts $P_g$ to generate the respective ciphertext $C_g$ (ahjxi56ldNBuh57 . . . ). Party D then construct a message package that identifies party D as the sender and designates several parties from the community as intended readers: I, G, A, F. The message package also includes $C_g$. Party D then finds it convenient to route the message package to party C. Party C does not find itself on the list of designated recipients, so it passes it on to whom ever it is convenient for it to pass it to. It happens to be party J, which also is not on the list of intended recipients. Party J passes the message package to party I, which readily recognizes itself on the list of recipients. Party I then applies its key, $K_1$ to the ciphertext in the message $C_g$. There are now two possibilities. If the decoy-tolerant method was used (e.g. BitFlip) the entire message $C_g$ would be discarded because none of it will be evaluated by I key ($K_1$) to any plaintext. Party I will then realize that it was posted on the recipient's list as a decoy recipient, and then party I will move the message package further. It passes it on to party H. There is another possibility—that the composite ciphertext method was used. In that case the ciphertext $C_g$ was constructed to the composite ciphertext for all 10 parties $C^{10}$. Party I will evaluate $C^{10}$ to net a zero plaintext and will realize that the composite ciphertext contains no message for it. Party I will then move the message package further, and it happens to be party H. Party H does not find itself as a posted recipient, and passes on to party G. Party G sees itself posted as a recipient and applies $C_g$ through its key $K_g$, to extract $P_g$—the confidential message that party D intended for it. Party G may not know that it is the only intended recipient. It sees that parties A and F are posted and not yet marked as 'read', so party G passes the message package to party F. Party F finds itself posted, applies $K_f$ to $C_g$ and concludes, like party I that it is not one of the intended recipients, so it passes the message package to party A, who sees itself posted, applies $K_a$ to $C_g$—concludes that it is a decoy posted recipient, and then observes that all the posted recipients are marked as having seen the package, so party A returns the message package to party D. Party D notes that all the posted recipients have marked on the message package that they have read the message, and so party D now concludes that its intended recipient, party G, has received the message, but others in the community don't know that the message was intended for party G. Any outside observer following on all communications will be equally in the dark.

Note that any party that is posted as an intended recipient (whether genuine or decoy) will mark itself as having read the message. Parties may use a standard private/public key mechanism to indicate that it has seen the message. This would prevent other parties from falsely or mistakenly mark another party as having read the message.

Figure 2:
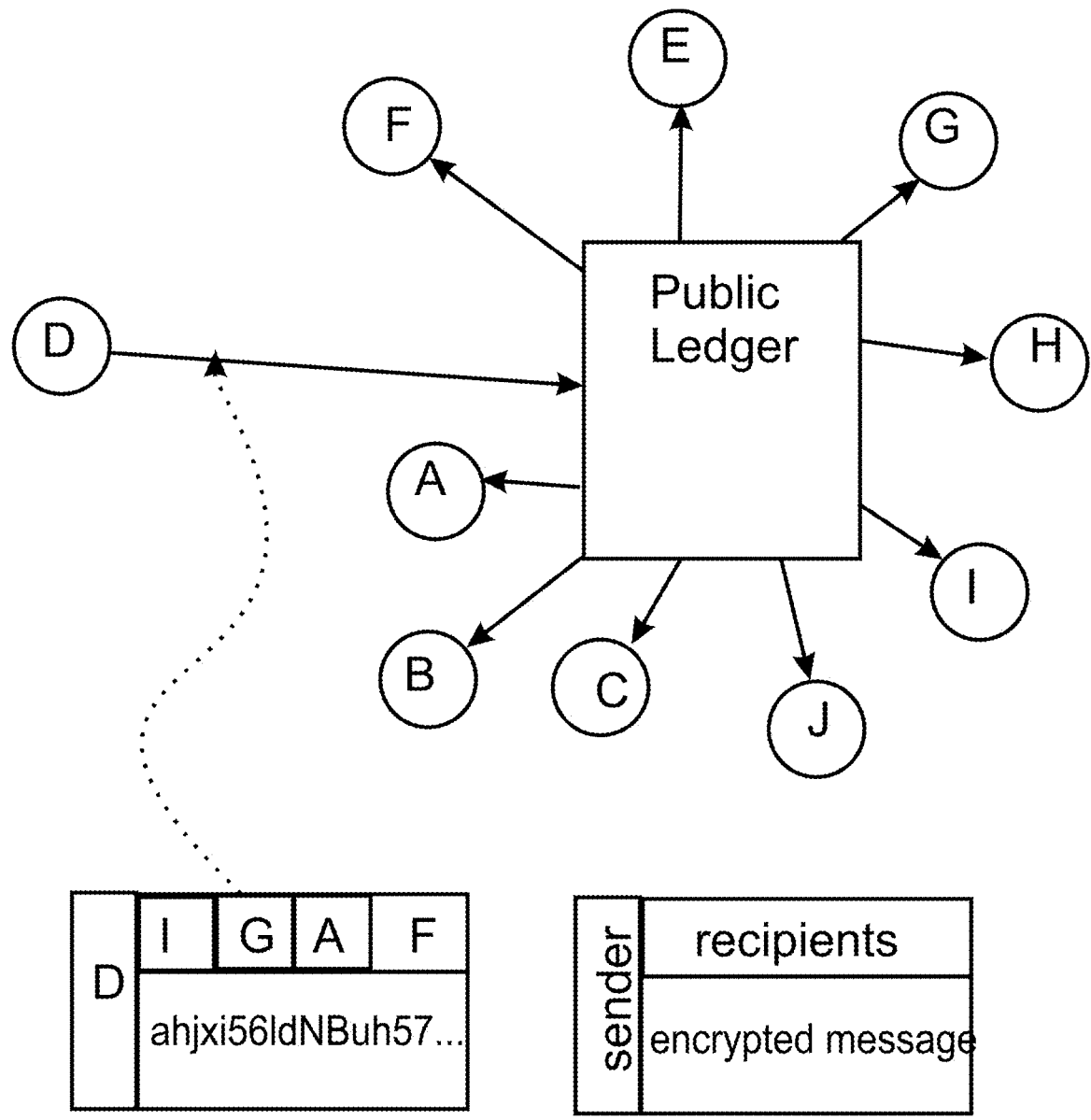

FIG. 2: Pubic Ledger BitGrey Protocol

Much as depicted in FIG. 1 party D prepares a message package. But here party D does not route it through the community, but rather posts the message package on a public ledger from where all the other parties download it. Parties that don't find themselves listed in the message package simply ignore it. Those that are listed apply their decryption key to the posted ciphertext. Only party G will extract from the package a meaningful message. But this fact will remain hidden.

Figure 3:
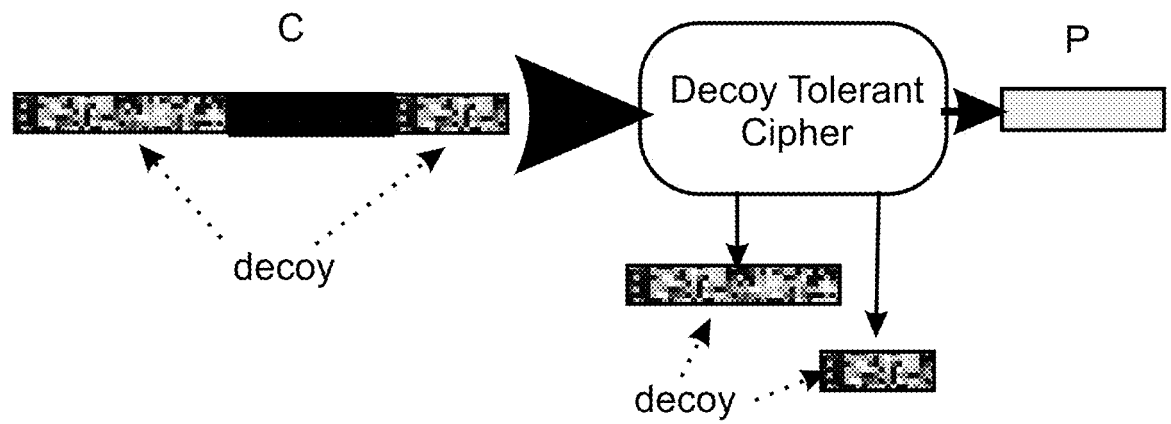

FIG. 3: Decoy Tolerant Cipher

This figure shows an input stream comprised of decoy bits (marked as splattered black) followed by content-loaded ciphertext (marked as black stripe), followed in turn by more decoy bits (also marked as a splatter black). The decoy-tolerant cipher will discard all the decoy bits and properly decrypt the content-loaded ciphertext, and extract from it the respective plaintext (marked as a white stripe).

Figure 4:
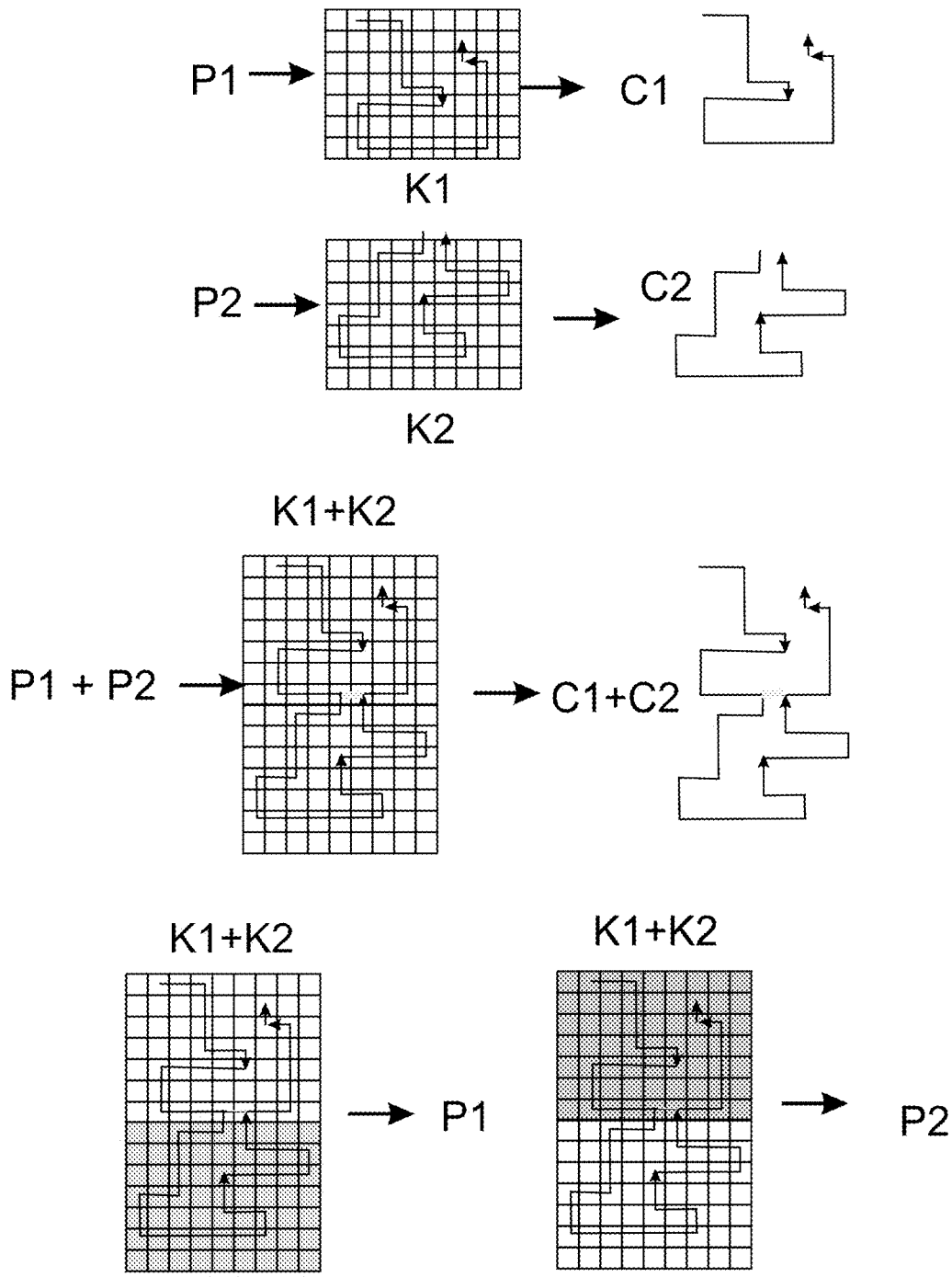

FIG. 4: BitMap Composite Ciphertext

The figure depicts a plaintext P1 processed on a BitMap map to generate the respective ciphertext, C1 in the form of a pathway marked on the key (the BitMap map). Same for plaintext P2 with respect to ciphertext C2. Below that the figure shows how the two maps (the two keys) are combined such that pathway C2 is grafted into pathway C1. The figure shows the composite ciphertext C1+C2 drawn on the combined maps. Below that the figure shows how the composite ciphertext is evaluated to P1 by the holder of the combined key where the second map is all marked with vertices of the same color. Accordingly the entire C2 pathway is collapsing to a single letter for the first observer, and the extracted plaintext is P1. The colored pixels indicate the same-letter vertices marked for the first reader. On the right side the figure shows how the composite ciphertext is evaluated to P2 by the reader for whom the first map is all marked with the same letter (all vertices are marked as the same letter). Accordingly all the traversals and turns of C1 do collapse to a single vertex for the second evaluator who uses the combined map where the first map vertices are marked with the same letter. In summary, this figure shows how the very same composite ciphertext, C1+C2 is evaluated to P1 by a reader given one key, and evaluated to P2 by a reader given the other key.

Figure 5:
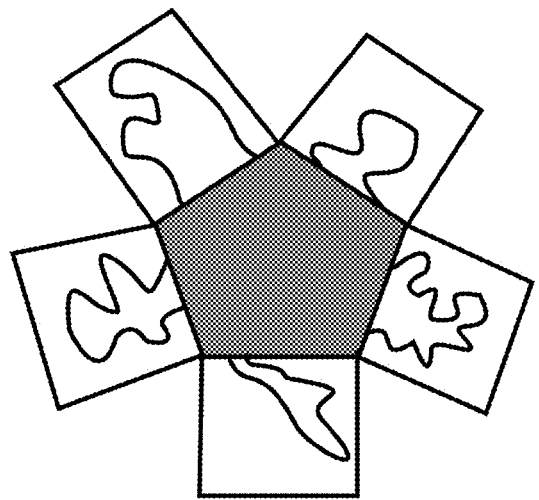
Figure 5:
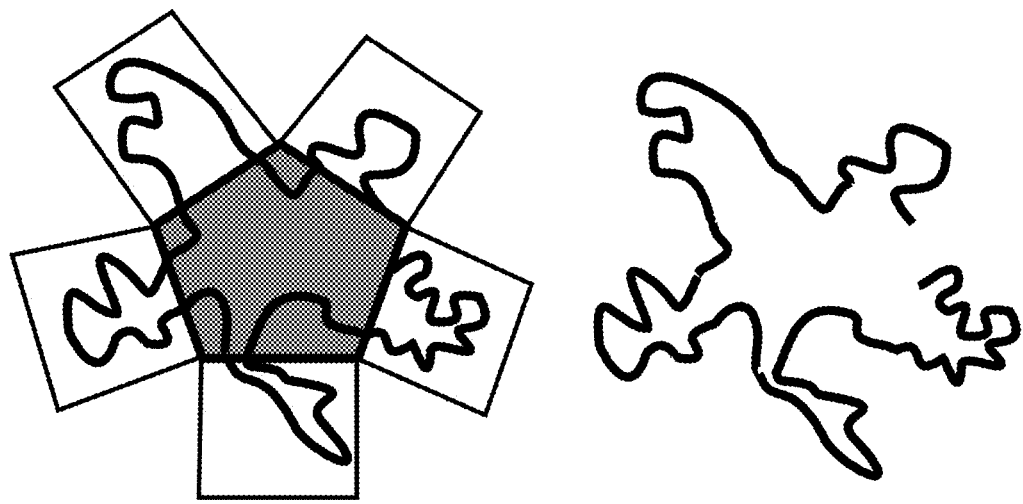

FIG. 5: BitMap Composite Ciphertext Key Construction

The figure shows a composite map (composite key) prepared to accommodate a community comprised of 5 parties. The top of the figure shows the key (the map) with a central pentagon marked by vertices all of the same letter. Each edge of the pentagon serves as a basis for a key dedicated to each of the five parties. In the picture the dedicated keys (maps) are all square, but this is not necessary, any shape will do. What matters is that it is abreast with its particular edge of the pentagon. The figure also shows how each party-dedicated section of the composite map is marked with a pathway that represents the ciphertext that in turn is the result of marking the respective plaintext on the map of its intended reader. One may note that all the depicted five pathways start at the pentagon edge and end at the pentagon edge. This can always be achieved, by pre-agreement that a certain count of letters from the end of the plaintext should be discarded because they were added only in order to draw the pathway (the ciphertext) to end at the Pentagon edge. We remember that all the vertices that comprise the various edges, like all the vertices inside the pentagon are all marked as the same letter. Below this, the figure shows how the individual pathways were threaded together through some arbitrary pathway that traces inside the pentagon. It does not matter how these connecting pathways are drawn because they all pass through vertices of same letter, and hence always collapse to a single vertex. The result of applying these four connecting pathways is that the five individual ciphertexts now form a single combined ciphertext (composite ciphertext) as shown to the right of the marked map.

Figure 6:
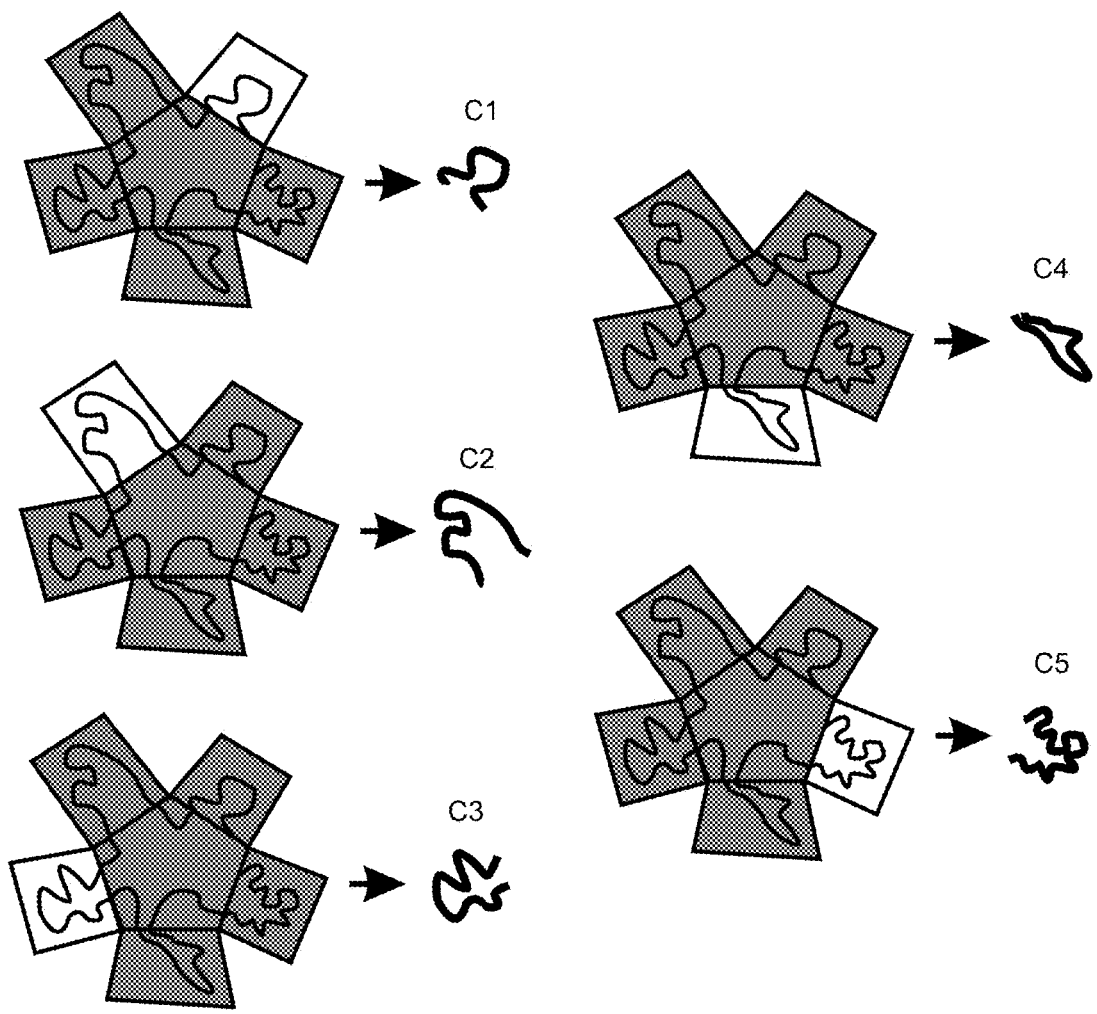
Figure 7:
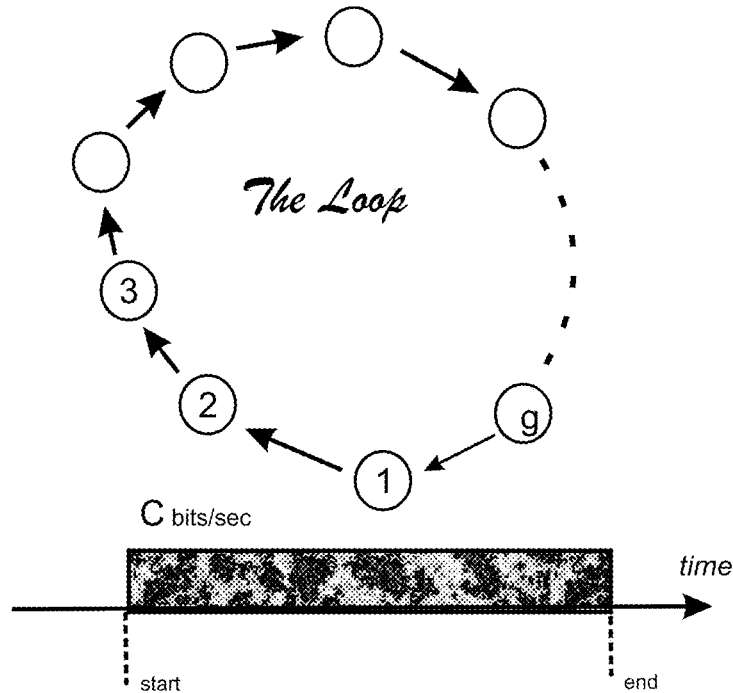

FIG. 6: BitMap Composite Ciphertext Decryption Variety

This figure is a continuation of FIG. 5. It shows how each of the five parties decrypts the same composite ciphertext into the message intended for it. The shaded areas are areas all comprised of vertices marked as the same letter. The first party gets the combined key with all the vertices are marked with the same letter except its own part of the combined map. Therefore when party 1 decrypts the composite ciphertext, it extract exactly the message intended to it. Respectively for the other parties. Each gets its own version of the same combined key (combined map), and each extracts from the composite ciphertext the exact part that it needs to interpret the message intended for it.

FIG. 7: The Loop

This figure depicts the loop that connects g members of a communicating group from 1 to g in a well-defined order. The arrows indicate how the C bits/sec stream propagates from member to member, rotating in a steady state, while some random count of bits gets flipped every time the stream moves from one member to the next. The bottom shows a time line with a point marked 'start' when the Loop session begins (the start up period and the close down periods are not shown), and a post marked 'end' when the loop session ends. Between these two time points the loop is expressed via C bits/seconds flowing from each member of the group to the next.

Figure 8:
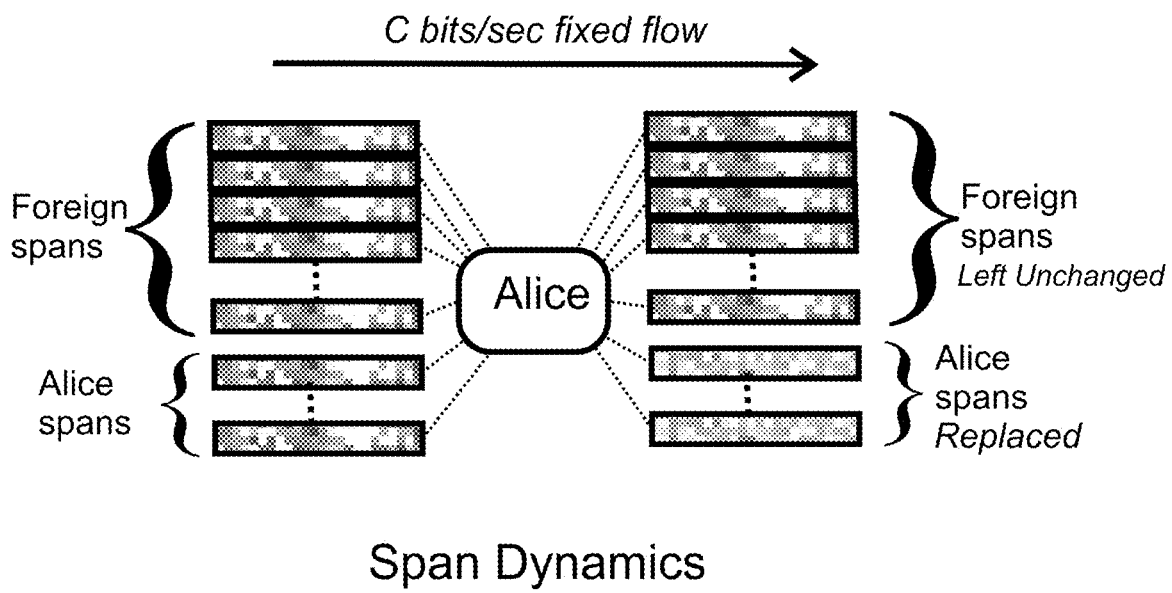

FIG. 8: Span Dynamics

This figure shows the flow of spans to Alice—a member of the looping group. The incoming flow is comprised of foreign spans, which were introduced to the flow by other members, and of Alice's spans—spans (strings of bits) that were introduced to the flow by Alice in the former round. The first category of spans, Alice processes with her cryptographic key, $K_a$. Being a loop cipher (namely either a decoy-tolerant cipher, or composite cipher), the output of the process is either 'null' (if the span was not intended for Alice), or some content (if the span was loaded up to the flow by someone intending to send Alice a message). Whichever the case, Alice, after processing the foreign spans, returns them to the flow, so they all propagate to the next member in the loop order. By contrast, Alice removes her own spans and replaces them with the same number of spans so as to keep the bit flow constant. If Alice has a message to convey to some other group member, she encrypts this message, cuts the resultant cryptogram to spans and feeds them to the flow, replacing her former spans, which she removes. If Alice has no message to send out, she constructs spans from random bits, in order to strictly replace every span she removes by a span she replaces.

Figure 9:
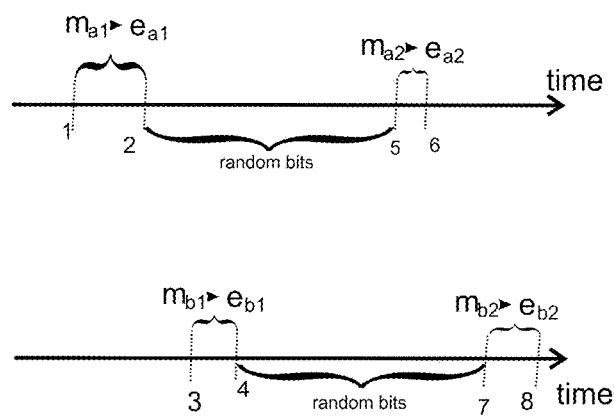

FIG. 9: Loop Conversation

This figure shows a conversation between Alice and Bob, two members of the group that exercises the BitLoop protocol. Alice has a message to send Bob: $m_{a1}$. She encrypts it using Bob's key, $K_b$, to generate the respective cryptogram $e_{a1}$=ENC($K_b$, $m_{a1}$). Alice cuts $e_{a1}$ to spans and at time point 1, she feeds them to the loop flow. By time point 2, all the spans are done, (namely, uploaded to the loop), and from that point on Alice feeds the loop with random bits. At time point 3, Bob, after having received Alice message, $e_{a1}$ as it came to him, flowing through the loop, has decrypted it with his key, $K_b$, and extracted its respective plaintext: $m_{a1}$=DEC($K_b$, $e_{a1}$). Having read Alice's message, Bob decides to reply with message $m_{b1}$. He encrypts it, using Alice's key, $K_a$: $e_{b1}$=ENC($K_a$, $m_{b1}$). Then Bob cuts the cryptogram to spans and feeds them to the loop at the time interval indicated as point 3 to point 4 on the time line. When done, Bob returns to feeding random bits to the flow. Alice receives Bob's message, decrypts it, and wishes to respond: message $m_{a2}$. She encrypts it, using Bob's key: $e_{a2}$=ENC($K_b$, $m_{a2}$), cuts the cryptogram to spans and feeds the spans to the flow in the time interval indicated as point 5 to point 6. Bob receiving this message, responds with $m_{b2}$, which he encrypts and feeds to the flow in time interval marked between point 7 and 8. And on it goes, Alice and Bob conversing indefinitely.

Figure 10:
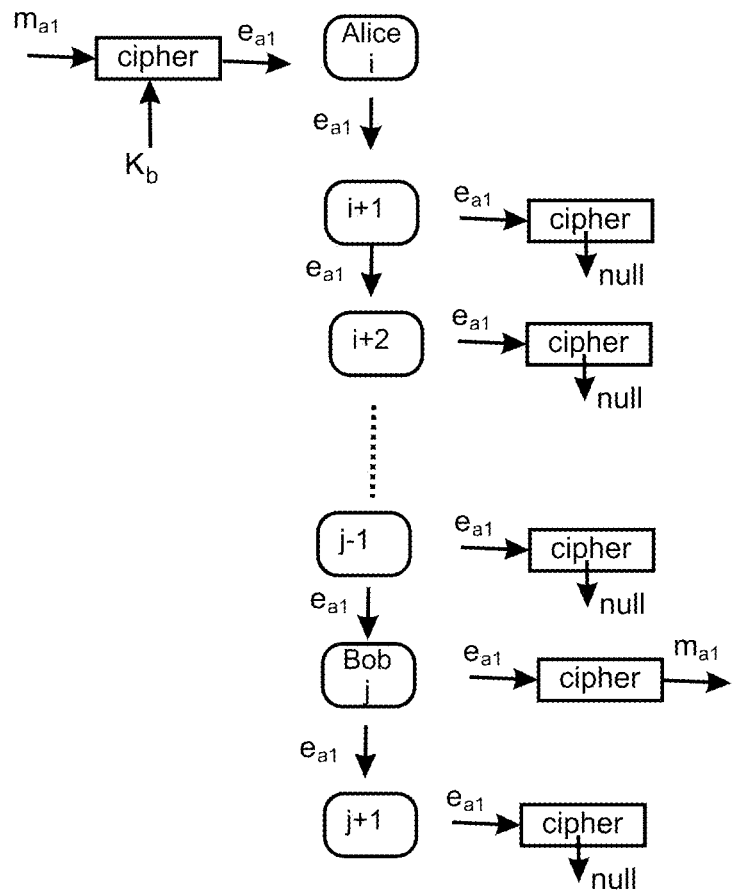

FIG. 10: BitLoop Cipher Decrypts Alice's Message only for Bob

This figure shows propagation from top to bottom. At the top left the figure depicts the BitLoop cipher operating on Alice's message to Bob: $m_{a1}$ and on Bob's key, $K_b$, to compute the respective cryptogram, $e_{a1}$. Alice is depicted as stationed in position i in the loop, and Bob is stationed in position j. Alice then pushes this cryptogram into the loop. The figure shows how all the members of the group, (i+1), (i+2) (j−1) process the cryptogram, each member via its own key. Since the BitLoop cipher is either decoy-tolerant or composite cipher, every one of those members generates a 'null'—and extracts no message from $e_{a1}$. Eventually the cryptogram arrives to Bob at position j. When he feeds the cryptogram to his cipher, using his key, $K_b$, the result is the plaintext version of the message Alice sent him: $m_{a1}$. Bob leaves the cryptogram in the flow, since the rule says that every member only replaces the spans that members contributed to the flow. All the next members (j+1), (j+2), ... will generate a 'null' result from processing this cryptogram. $e_{a1}$ eventually returns to Alice which replaces it, per protocol.

Figure 11:
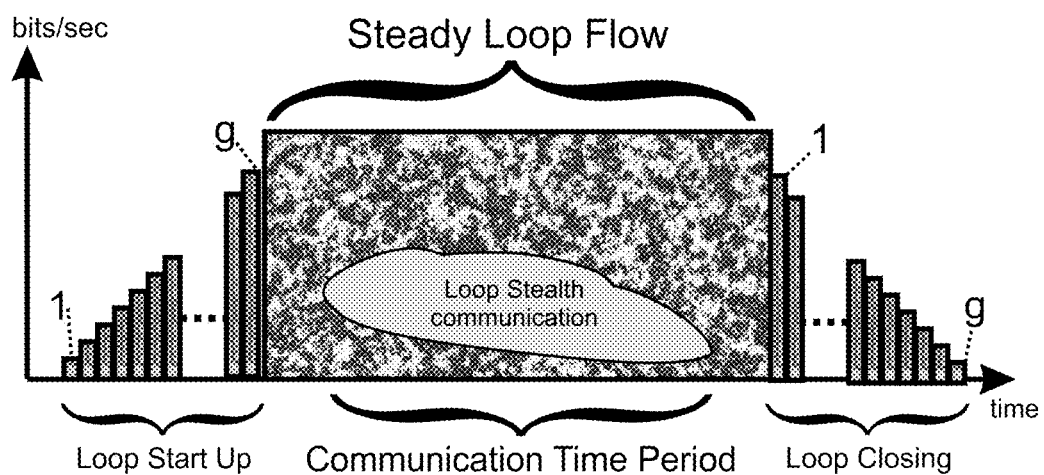

FIG. 11: Loop Life Cycle

This figure shows how a loop session is started, geared up, operated for a while, and then ratcheted down to termination. The start up period is marked by each group member, in turn, adding its share of randomized spans. The adding starts with group #1, and continues in order. When the flow hits the next member, it grows with the share of spans added by this member (all the C/g bits so added by a member per second are random). When the first round is complete, the loop becomes a steady flow of C bits/sec. This steady flow keeps on for the duration of this loop session, until, as shown in the figure, it is time to wind it down. This happens in reverse order to the start up. One by one each group member simply removes the spans it contributed the last time around, and thereby reduces the bit flow by a measure of C/g bits/sec. When this process of reduction returns to member #1 (which started the reduction), the flow is terminated, and so is the session. During the steady state phase, the figure shows a "whale like" shape inside the rectangle that represents the steady bit flow. This figures represents the minute-by-minute rate of contents-laden communication concealed in the randomized flow. At each time point, the vertical interval within the "whale" represents the content part of the flow. The figure shows how the content part starts some time after the beginning of the session, and ends some time before the end of the session. It starts and ends small, and swells to large size in between.

Figure 12:
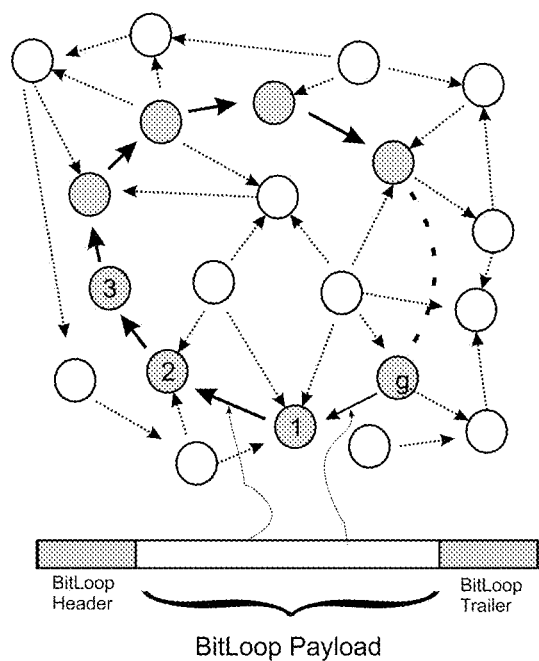

FIG. 12: BitLoop Embedded Mode

This figure shows the configuration of a loop when its members are distributed within a larger network that includes nodes that are not part of the loop. The group members are shaded, the non-group members are not. This configuration requires identification of loop traffic. Such identification may be exercised in several ways, including loop pre-encryption where the loop flow is encrypted and pre-packaged, where the package is decrypted by the various nodes before the data is being loop-processed. A simpler way is to wrap the loop traffic with headers and trailers that would indicate to group members that the coming bit flow is loop traffic. An embedded loop may be well concealed within the larger network.

Figure 13:
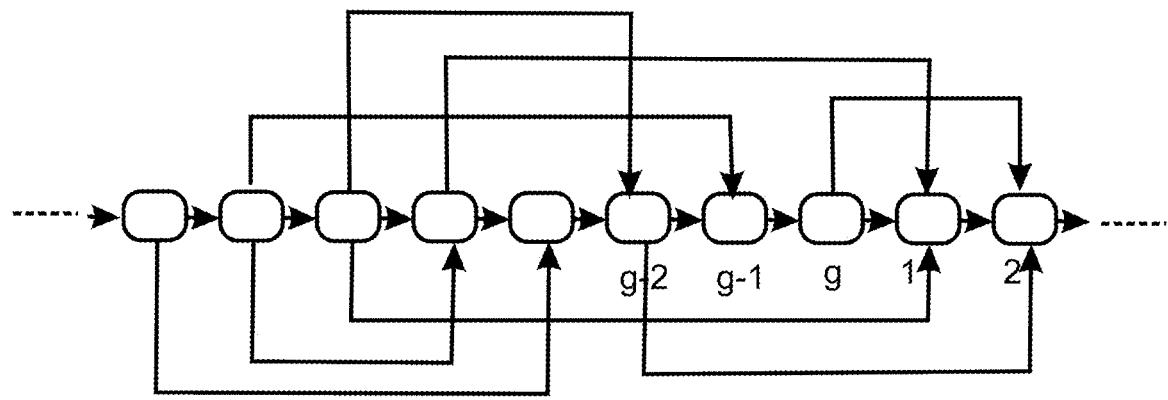

FIG. 13: The Conversations the BitLoop Hides

This figure shows the sequence of members in an endless line, where group g is followed by group #1. On this line the figure shows how different members send messages to other members, who get them later, given that the depicted sequence may express a time line when a fictional head point of the flow propagates from one member to another.

Figure 14:
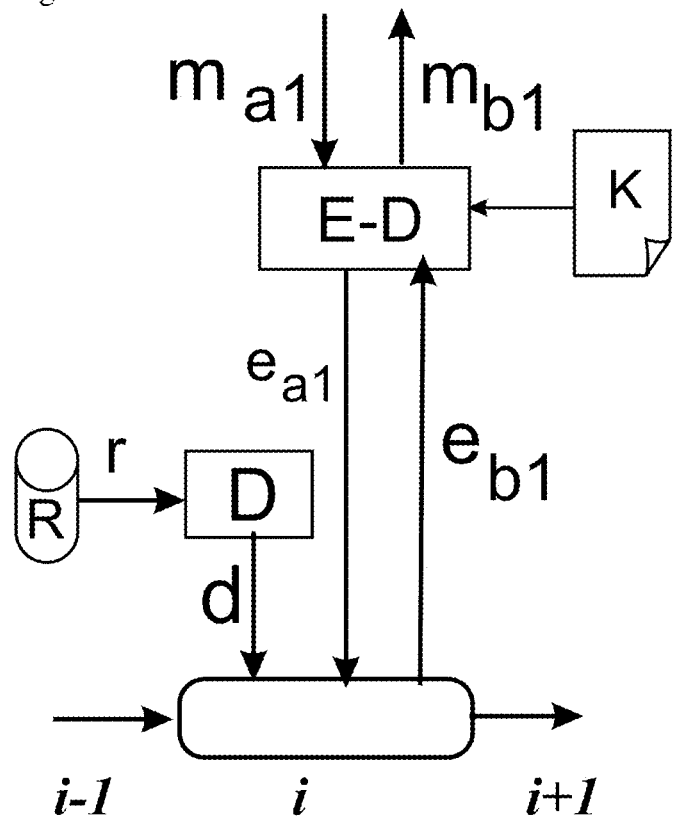

FIG. 14: Functional Components of BitLoop Member

The figure shows the member in station i, Alice, being fed the loop stream from member (i−1). It extracts from the incoming loop traffic message $e_{b1}$ uploaded to the stream by Bob at some station j. Alice processes $e_{b1}$ via the BitLoop cipher marked as E-D, feeding into it its key, $K_a$, found in the key table marked as "K". Alice thereby extracts the respective plaintext $m_{b1}$ and evaluates its content. In response, Alice wishes to send Bob message $m_{a1}$. She feeds it to the same cipher, marked as E-D, reads in Bob's key, $K_b$, from the key table marked "K", computes the respective ciphertext $e_{a1}$ and feeds its spans, as her contribution to the steady loop flow. When Alice has no message to feed into the loop, she resorts to her randomness generator, marked as "R" and builds from in the module "D" sufficient decoy spans, marked as "d" to replace the spans Alice put into the stream in the former round.

Figure 15:
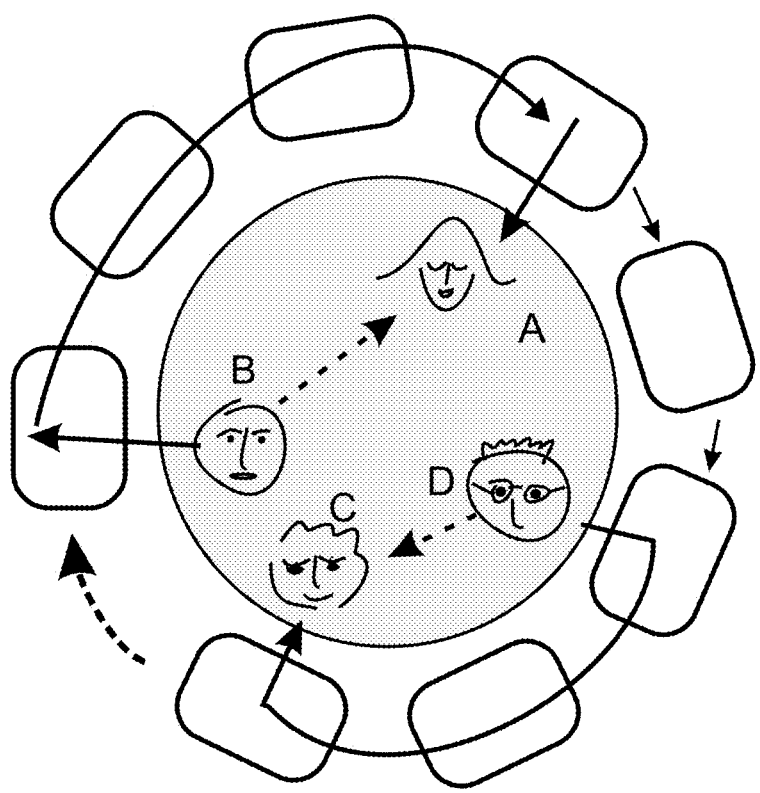

FIG. 15: Loop Configuration and Functional Conversation

This figure casts the functional loop conversation against the loop-procedural image thereto. The shaded circle depicts the members of the group as they are involved in a conversation. Bob is depicted saying something to Alice (dotted line from B to A). This is the functional depiction. The respective procedural embodiment is through the loop where Bob encrypts his message for Alice, feeds it into the flowing loop where it traverses from member to member until it reaches Alice. Alice is the singled out member who has the proper key to decrypt Bob's message. She does so and reads in Bob's message. A similar exchange is depicted between David and Carla. The functional message is depicted via the dotted line from D to C, and the loop-procedural embodiment is depicted as a pathway between the connected members.

REFERENCES

1. N/A
2. G. Samid "Randomness Rising" 14th International Conference on Foundations of Computer Science (FCS'18: Jul. 30-Aug. 2, 2018, Las Vegas, USA)
3. N/A
4. G. Samid "Drone Targeted Cryptography"
5. G. Samid "Rivest Chaffing and Winnowing Cryptography Elevated into a Full-Fledged Cryptographic Strategy" Int'l Conf. e-Learning, e-Bus., EIS, and e-Gov.|EEE'18|
6. G. Samid "User Centric Cryptography" Int'l Conf. on Security and Management, SAM 16
7. N/A
8. G. Samid, "Cryptography of Things" ICOMP16 International Conference.
9. G. Samid, "Threat Adjusting Security"
10. N/A
11. N/A
12. Popov Samid 2017 "BitFlip: A Randomness-Rich Cipher"
13. R. RIVEST, "Chaffing and winnowing: Confidentiality without encryption.
14. Samid 2002: "At-Will Intractability Up to Plaintext Equivocation Achieved via a Cryptographic Key Made As Small, or As Large As Desired—Without Computational Penalty" G. Samid, 2002 International Workshop on CRYPTOLOGY AND NETWORK SECURITY San Francisco, Calif., USA Sep. 26-28, 2002
15. United States Patent Application 20170250796
16. U.S. Pat. No. 6,823,068 "Denial Cryptography based on Graph Theory"

What is claimed is:

1. A method utilizing a combination of encrypted message data and additional randomized bits to both secure and conceal communications between communication stations, comprising;
    organizing a plurality of communication stations in a distributed configuration;
    transmitting, by a communication station of the plurality of communication stations to another targeted communication station of the plurality of communication stations, an encrypted meaningful message, this transmitted encrypted meaningful message appearing as random bits to an outside observer or eavesdropper;

actively preventing an outside observer or eavesdropper from identifying the transmitting communication station of the encrypted meaningful message by preventing an outside observer or eavesdropper from distinguishing between this transmitted encrypted meaningful message appearing as random bits, and additional transmitted random bits that are transmitted in the same interval of time between the remaining communication stations out of the plurality of communication stations, by having all the remaining communication stations out of the plurality of communication stations transmit random bit strings to randomly selected communication stations out of the plurality of communication stations, these random bit string transmissions occurring at random points of time; and actively preventing an outside observer or eavesdropper from identifying the targeted communication station of the plurality of communication stations that receives the encrypted meaningful message appearing as random bits to an outside observer or eavesdropper, by having the encrypted meaningful message appearing as random bits also transmitted to all the remaining communication stations out of the plurality of communication stations in addition to targeted communication stations, with the remaining communication stations out of the plurality of communication stations determining that the encrypted meaningful message is not intended for them based on content of the encrypted meaningful message, and additionally having all the communication stations out of the plurality of communication stations transmit random bit strings at the same interval of time to randomly selected communication stations out of the plurality of communication stations, these random bit string transmissions occurring at random points of time.

2. The method of claim 1, wherein a cipher utilized for encryption and decryption is a decoy tolerant cipher, in which a recipient of a ciphertext stream can distinguish between bits that represent encrypted plaintext and bits that are random and carry no message.

3. The method of claim 1, wherein a cipher utilized for encryption and decryption is a composite cipher, in which a ciphertext $C^*$ may be decrypted to an arbitrary number t of corresponding plaintexts $P_1, P_2, \ldots P_t$, with each plaintext $P_i$, i=1, 2, . . . t computed via a respective key $K_i$: $P_i$=Decryption($C^*, K_i$).

4. The method of claim 1, wherein an encrypted message in a form of a bit string is passed from one communication station to other communication stations, but only intended target communication stations of the encrypted message decrypt the encrypted message, while non-targeted communication stations treat the encrypted message as a random stream of bits.

5. The method of claim 1, wherein messages are posted on a public ledger, all communication stations download contents of the public ledger, with each communications station identifying public ledger messages intended for itself, and decrypting an identified message intended for itself.

6. A communications system configured to utilize a combination of encrypted message data and additional randomized bits to both secure and conceal communications between communication stations, comprising;

a plurality of s communication stations, each comprising a hardware processor and memory;

wherein the plurality of s communication stations are organized in a fixed circular configuration of $-1,2,3, \ldots s,1-$;

each communication station configured to:

transmit messages to the next communication station in the circular configuration, in a fixed order, at a fixed circular flow rate of a bit package of C bits per round around the circular configuration, comprised of R random bits per round plus M message bits per round around the circular configuration, the M message bits per round also appearing as random bits that are indistinguishable to an outside observer or eavesdropper from the R random bits per round;

wherein each communication station's transmitted M message bits per round are comprised of messages to any other of the plurality of communication stations;

each communication station further configured to:

actively prevent an outside observer or eavesdropper that sees the overall flow of the bit package of C bits per round, from being able to identify how many of these C bits per round are meaningless, randomized, or represent a meaningful message, by configuring the transmitted messages between communication stations, to comprise R random bits plus M message bits, where these M message bits also appear as random bits to an outside observer or eavesdropper, actively prevent an outside observer or eavesdropper that sees the overall flow of the bit package of C bits per round, from being able to identify a communication station that transmits data to another communication station, a communication station that receives data from another communication station, the frequency of when data is transmitted between communication stations, and/or the amount of data that is transmitted between communication stations, by configuring the transmitted messages between communication stations, to comprise R=C−M random bits plus M message bits and to keep a fixed flow rate of C bits per round, where these M message bits also appear as random bits to an outside observer or eavesdropper; and pass each bit package to the next communication station in the circular order, until each bit package returns to the communication station that submitted the returned bit package for circulation, at which time the communication station that submitted the returned bit package for circulation, replaces the returned bit package with a replacement bit package comprised of a different combination of M bits and R bits;

wherein each communication station is configured to detect any message intended for it, and to properly decrypt it.

7. The system of claim 6, wherein every communication station contributes C bits per round to the circular flow, and replaces the C bits per round sent in a previous cycle with new C bits per round, and where in case a communication station wishes to send no message to another communication station, the sending communication station uses a source for random bits to construct its refreshed flow of C bits per round; and if the sending communication station wishes to send a message m to another communication station, the sending communication station encrypts m to a ciphertext of size |m|, and constructs the next round of C bits per round from m plus C−|m| random bits.

8. A method utilizing a combination of encrypted message data and additional randomized bits to both secure and conceal communications between communication stations, comprising;

organizing a plurality of s communication stations in a fixed circular configuration of –1,2,3, . . . s,1–;

transmitting messages from a communication station to the next communication station in the circular configuration, in a fixed order, at a fixed circular flow rate of a bit package of C bits per round around the circular configuration, comprised of R random bits per round plus M message bits per round around the circular configuration, the M message bits per round also appearing as random bits that are indistinguishable to an outside observer or eavesdropper from the R random bits per round;

wherein each communication station's transmitted M message bits per round are comprised of messages to any other of the plurality of communication stations;

actively preventing an outside observer or eavesdropper that sees the overall flow of the bit package of C bits per round, from being able to identify how many of these C bits per round are meaningless, randomized, or represent a meaningful message, by transmitting messages between communication stations that comprise R random bits plus M message bits, these M message bits also appearing as random bits to an outside observer or eavesdropper;

actively preventing an outside observer or eavesdropper that sees the overall flow of the bit package of C bits per round, from being able to identify a communication station that transmits data to another communication station, a communication station that receives data from another communication station, the frequency of when data is transmitted between communication stations, and/or the amount of data that is transmitted between communication stations, by transmitting messages between communication stations that comprise R=C–M random bits plus M message bits and by keeping a fixed flow rate of C bits per round, these M message bits also appearing as random bits to an outside observer or eavesdropper; and passing each bit package from a communication station to the next communication station in the circular order, until each bit package returns to the communication station that submitted the returned bit package for circulation, at which time the communication station that submitted the returned bit package for circulation, replaces the returned bit package with a replacement bit package comprised of a different combination of M bits and R bits;

wherein each communication station detects any message intended for it, and properly decrypts it.

9. The method of claim 8, wherein the number of bits transmitted per second in the circular flow is kept constant regardless of the ratio between message bits as compared to random bits.

10. The method of claim 8, wherein a cipher utilized for encryption and decryption is a decoy tolerant cipher, in which a recipient of a ciphertext stream can distinguish between bits that represent encrypted plaintext and bits that are random and carry no message.

11. The method of claim 8, wherein a cipher utilized for encryption and decryption is a composite cipher, in which a ciphertext C* may be decrypted to an arbitrary number t of corresponding plaintexts $P_1, P_2, \ldots P_t$, with each plaintext $P_i$, i=1, 2, . . . t computed via a respective key $K_i$: $P_i$=Decryption(C*, $K_i$).

12. The method of claim 8, wherein an encrypted message in a form of a bit string is passed from one communication station to other communication stations, but only intended target communication stations of the encrypted message decrypt the encrypted message, while non-targeted communication stations treat the encrypted message as a random stream of bits.

13. The system of claim 8, wherein every communication station contributes C bits per round to the circular flow, and replaces the C bits per round sent in a previous cycle with new C bits per round, and where in case a communication station wishes to send no message to another communication station, the sending communication station uses a source for random bits to construct its refreshed flow of C bits per round; and if the sending communication station wishes to send a message m to another communication station, the sending communication station encrypts m to a ciphertext of size |m|, and constructs the next round of C bits per round from m plus C–|m| random bits.

* * * * *